(12) United States Patent
Waldspurger et al.

(10) Patent No.: US 7,925,850 B1
(45) Date of Patent: Apr. 12, 2011

(54) PAGE SIGNATURE DISAMBIGUATION FOR INCREASING THE EFFICIENCY OF VIRTUAL MACHINE MIGRATION IN SHARED-PAGE VIRTUALIZED COMPUTER SYSTEMS

(75) Inventors: Carl Waldspurger, Palo Alto, CA (US); Osten Kit Colbert, San Francisco, CA (US); Xiaoxin Chen, Cupertino, CA (US); Rajesh Venkatasubramanian, Pleasanton, CA (US)

(73) Assignee: VMware, Inc., Palo Alto, CA (US)

( * ) Notice: Subject to any disclaimer, the term of this patent is extended or adjusted under 35 U.S.C. 154(b) by 749 days.

(21) Appl. No.: 11/676,224

(22) Filed: Feb. 16, 2007

(51) Int. Cl.
*G06F 12/00* (2006.01)
*G06F 13/00* (2006.01)
*G06F 13/28* (2006.01)

(52) U.S. Cl. ...................................................... 711/162
(58) Field of Classification Search ................... 711/162
See application file for complete search history.

(56) References Cited

U.S. PATENT DOCUMENTS

| | | | |
|---|---|---|---|
| 6,075,938 A | 6/2000 | Bugnion et al. | |
| 6,789,156 B1 * | 9/2004 | Waldspurger | 711/6 |
| 7,634,657 B1 * | 12/2009 | Stringham | 713/168 |
| 2008/0127182 A1 * | 5/2008 | Newport et al. | 718/1 |

OTHER PUBLICATIONS

Sapuntzakis, Constantine P. et al., "Optimizing the Migration of Virtual Computers," USENIX Association, *5th Symposium on Operating Systems Design and Implementation*, pp. 377-390.
Waldspurger, Carl A., "Memory Resource Management in VMware ESX Server," *Proc. Fifth Symposium on Operating Systems Design and Implementation* (OSDI '02), Dec. 2002, pp. 1-14.
Nelson, Michael et al., "Fast Transparent Migration for Virtual Machines," USENIX Association, 2005 *USENIX Annual Technical Conference*, Anaheim, California, Apr. 10-15, 2005, pp. 391-394.

* cited by examiner

*Primary Examiner* — Kevin L Ellis
*Assistant Examiner* — Chad L Davidson

(57) ABSTRACT

A system for increasing the efficiency of migrating, at least in part, a virtual machine from a source host to a destination host is described wherein the content of one or more portions of the address space of the virtual machine are each uniquely associated at the source host with a signature that may collide, absent disambiguation, with different content at the destination host. Code in both the source and destination hosts disambiguates the signature(s) so that each disambiguated signature may be uniquely associated with content at the destination host, and so that collisions with different content are avoided at the destination host. Logic is configured to determine whether the content uniquely associated with a disambiguated signature at the destination host is already present in the destination host memory, and, if so, to back one or more portions of the address space of the virtual machine having this content with one or more portions of the destination host memory already holding this content.

36 Claims, 7 Drawing Sheets

US 7,925,850 B1

PAGE SIGNATURE DISAMBIGUATION FOR INCREASING THE EFFICIENCY OF VIRTUAL MACHINE MIGRATION IN SHARED-PAGE VIRTUALIZED COMPUTER SYSTEMS

BACKGROUND OF THE INVENTION

1. Field of the Invention

This invention relates generally to the field of virtual machines, and, more specifically, to techniques for increasing the efficiency of the process of migrating a virtual machine from a source host to a destination host.

2. Description of the Related Art

A virtual machine is a virtual embodiment of a computer in which the computer resources are virtual rather than physical hardware. A virtual machine is typically implemented as software executing on a host computer. A virtual machine can often be hosted by a variety of host computers, with the details of the particular host computer remaining at least mostly transparent to the virtual machine.

As is well known in the field of computer science, a virtual machine (VM) is an abstraction—a "virtualization"—of an actual physical computer system. FIG. 1A shows one possible arrangement of a computer system 70 that implements virtualization. A virtual machine (VM) or "guest" 20 is installed on a "host platform," or simply "host," which will include system hardware, that is, a hardware platform 10, and one or more layers or co-resident components comprising system-level software, such as an operating system or similar kernel, or a virtual machine monitor or hypervisor (see below), or some combination of these. The system hardware typically includes one or more processors 11, memory 13, some form of mass storage 14, and various other devices 17.

Each VM 20, ..., 20-n will typically have both virtual system hardware 28 and guest system software 29. The virtual system hardware typically includes at least one virtual CPU, virtual memory 23, at least one virtual disk 24, and one or more virtual devices 27. Note that a disk—virtual or physical—is also a "device," but is usually considered separately because of the important role of the disk. All of the virtual hardware components of the VM may be implemented in software using known techniques to emulate the corresponding physical components. The guest system software includes a guest operating system (OS) 22 and drivers 25 as needed for the various virtual devices 27.

Note that a single VM may be configured with more than one virtualized processor. To permit computer systems to scale to larger numbers of concurrent threads, systems with multiple CPUs have been developed. These symmetric multi-processor (SMP) systems are available as extensions of the PC platform and from other vendors. Essentially, an SMP system is a hardware platform that connects multiple processors to a shared main memory and shared I/O devices. Virtual machines may also be configured as SMP VMs. FIG. 1A, for example, illustrates multiple virtual processors 21-0, 21-1, ..., 21-m (VCPU0, VCPU1, VCPUm) within the VM 20.

Yet another configuration is found in a so-called "multi-core" architecture, in which more than one physical CPU is fabricated on a single chip, with its own set of functional units (such as a floating-point unit and an arithmetic/logic unit ALU), and can execute threads independently; multi-core processors typically share only very limited resources, such as some cache. Still another technique that provides for simultaneous execution of multiple threads is referred to as "simultaneous multi-threading," in which more than one logical CPU (hardware thread) operates simultaneously on a single chip, but in which the logical CPUs flexibly share some resource such as caches, buffers, functional units, etc. This invention may be used regardless of the type—physical and/or logical—or number of processors included in a VM.

If the VM 20 is properly designed, applications 26 running on the VM will function as they would if run on a "real" computer, even though the applications are running at least partially indirectly, that is via the guest OS 22 and virtual processor(s). Executable files will be accessed by the guest OS from the virtual disk 24 or virtual memory 23, which will be portions of the actual physical disk 14 or memory 13 allocated to that VM. Once an application is installed within the VM, the guest OS retrieves files from the virtual disk just as if the files had been pre-stored as the result of a conventional installation of the application. The design and operation of virtual machines are well known in the field of computer science.

Some interface is generally required between the guest software within a VM and the various hardware components and devices in the underlying hardware platform. This interface—which may be referred to generally as "virtualization software"—may include one or more software components and/or layers, possibly including one or more of the software components known in the field of virtual machine technology as "virtual machine monitors" (VMMs), "hypervisors," or virtualization "kernels." Because virtualization terminology has evolved over time and has not yet become fully standardized, these terms do not always provide clear distinctions between the software layers and components to which they refer. For example, "hypervisor" is often used to describe both a VMM and a kernel together, either as separate but cooperating components or with one or more VMMs incorporated wholly or partially into the kernel itself; however, "hypervisor" is sometimes used instead to mean some variant of a VMM alone, which interfaces with some other software layer(s) or component(s) to support the virtualization. Moreover, in some systems, some virtualization code is included in at least one "superior" VM to facilitate the operations of other VMs. Furthermore, specific software support for VMs may be included in the host OS itself; moreover, there may also be specific support for virtualization in the system hardware. Unless otherwise indicated, the invention described below may be used in virtualized computer systems having any type or configuration of virtualization software.

Moreover, FIG. 1A shows virtual machine monitors 30, ..., 30-n that appear as separate entities from other components of the virtualization software. Furthermore, some software components used to implemented one illustrated embodiment of the invention are shown and described as being within a "virtualization layer" located logically between all virtual machines and the underlying hardware platform and/or system-level host software. This virtualization layer can be considered part of the overall virtualization software, although it would be possible to implement at least part of this layer in specialized hardware. Unless otherwise indicated, the invention described below may be used in virtualized computer systems having any type or configuration of virtualization software. Moreover, the invention is described and illustrated below primarily as including one or more virtual machine monitors that appear as separate entities from other components of the virtualization software and perform certain functions relating to the invention. This is only for the sake of simplicity and clarity and by way of illustration—as mentioned above, the distinctions are not always so clear-cut, and the use of the term virtual machine monitor or just VMM is meant to encompass whichever component(s) in the virtualization software that perform the indicated functions, regardless of what name they are given. Again, unless otherwise indicated or apparent from the description, it is to be assumed that the invention can be implemented anywhere within the overall structure of the virtualization software, and even in systems that provide specific hardware support for virtualization.

The various virtualized hardware components in the VM, such as the virtual CPU(s), the virtual memory 23, the virtual disk 24, and the virtual device(s) 27, are shown as being part of the VM 20 for the sake of conceptual simplicity. In actuality, these "components" are usually implemented as software emulations 33 included in the VMM. One advantage of such an arrangement is that the VMM may (but need not) be set up to expose "generic" devices, which facilitate VM migration and hardware platform-independence.

Different systems may implement virtualization to different degrees—"virtualization" generally relates to a spectrum of definitions rather than to a bright line, and often reflects a design choice with respect to a trade-off between speed and efficiency on the one hand and isolation and universality on the other hand. For example, "full virtualization" is sometimes used to denote a system in which no software components of any form are included in the guest other than those that would be found in a non-virtualized computer; thus, the guest OS could be an off-the-shelf, commercially available OS with no components included specifically to support use in a virtualized environment.

In contrast, another concept, which has yet to achieve a universally accepted definition, is that of "para-virtualization." As the name implies, a "para-virtualized" system is not "fully" virtualized, but rather the guest is configured in some way to provide certain features that facilitate virtualization. For example, the guest in some para-virtualized systems is designed to avoid hard-to-virtualize operations and configurations, such as by avoiding certain privileged instructions, certain memory address ranges, etc. As another example, many para-virtualized systems include an interface within the guest that enables explicit calls to other components of the virtualization software.

For some, para-virtualization implies that the guest OS (in particular, its kernel) is specifically designed to support such an interface. According to this view, having, for example, an off-the-shelf version of Microsoft Windows XP as the guest OS would not be consistent with the notion of para-virtualization. Others define para-virtualization more broadly to include any guest OS with any code that is specifically intended to provide information directly to any other component of the virtualization software. According to this view, loading a module such as a driver designed to communicate with other virtualization components renders the system para-virtualized, even if the guest OS as such is an off-the-shelf, commercially available OS not specifically designed to support a virtualized computer system. Unless otherwise indicated or apparent, this invention is not restricted to use in systems with any particular "degree" of virtualization and is not to be limited to any particular notion of full or partial ("para-") virtualization.

In addition to the sometimes fuzzy distinction between full and partial (para-) virtualization, two arrangements of intermediate system-level software layer(s) are in general use—a "hosted" configuration and a non-hosted configuration (which is shown in FIG. 1A). In a hosted virtualized computer system, an existing, general-purpose operating system forms a "host" OS that is used to perform certain input/output (I/O) operations, alongside and sometimes at the request of the VMM. The Workstation product of VMware, Inc., of Palo Alto, Calif., is an example of a hosted, virtualized computer system, which is also explained in U.S. Pat. No. 6,496,847 (Bugnion, et al., entitled "System and Method for Virtualizing Computer Systems").

As illustrated in FIG. 1A, in many cases, it may be beneficial to deploy VMMs on top of a software layer—a kernel 60—constructed specifically to provide efficient support for the VMs. This configuration is frequently referred to as being "non-hosted." Compared with a system in which VMMs run directly on the hardware platform, use of a kernel offers greater modularity and facilitates provision of services (for example, resource management) that extend across multiple virtual machines. Compared with a hosted deployment, a kernel may offer greater performance because it can be co-developed with the VMM and be optimized for the characteristics of a workload consisting primarily of VMs/VMMs. The kernel 60 also handles any other applications running on it that can be separately scheduled, as well as an optional console operating system (COS 42) that, in some architectures, is used to boot the system and facilitate certain user interactions, via user-level applications 43 with the virtualization software.

Note that the kernel 60 is not the same as the kernel that will be within the guest OS 22—as is well known, every operating system has its own kernel. Note also that the kernel 60 is part of the "host" platform of the VM/VMM as defined above even though the configuration shown in FIG. 1A is commonly termed "non-hosted;" moreover, the kernel may be both part of the host and part of the virtualization software or "hypervisor." The difference in terminology is one of perspective and definitions that are still evolving in the art of virtualization.

The address space of the memory 13 is partitioned into pages, regions, or other analogous allocation units. Applications address the memory using virtual addresses (VAs), each of which typically comprises a virtual page number (VPN) and an offset into the indicated page. The VAs are then mapped to physical addresses (PAs), each of which similarly comprises a physical page number (PPN) and an offset, and which is actually used to address the physical memory 13. The same offset is usually used in both a VA and its corresponding PA, so that only the VPN needs to be converted into a corresponding PPN.

The concepts of VPNs and PPNs, as well as the way in which the different page numbering schemes are implemented and used, are described in many standard texts, such as "Computer Organization and Design: The Hardware/Software Interface," by David A. Patterson and John L. Hennessy, Morgan Kaufmann Publishers, Inc., San Francisco, Calif., 1994, pp. 579-603 (chapter 7.4 "Virtual Memory"). Similar mappings are used in region-based architectures or, indeed, in any architecture where relocatability is possible.

An extra level of addressing indirection is typically implemented in virtualized systems in that a VPN issued by an application running in a VM is remapped twice in order to determine which page of the hardware memory is intended. The first mapping is provided by the guest OS, which translates the guest VPN (GVPN) into a corresponding guest PPN (GPPN) in the conventional manner. The guest OS therefore "believes" that it is directly addressing the actual hardware memory, but in fact it is not.

Of course, a valid address to the actual hardware memory must ultimately be generated. A memory management module, located typically somewhere in the virtualization software (such as in the VMM), therefore performs the second mapping by taking the GPPN issued by the guest OS and mapping it to a hardware (or "machine") page number PPN that can be used to address the hardware memory 13. This GPPN-to-PPN mapping may instead be done in the main system-level software layer, depending on the implementation. From the perspective of the guest OS 22, the GVPN and GPPN might be virtual and physical page numbers just as they would be if the guest OS were the only OS in the system. From the perspective of the system software, however, the GPPN is a page number that is then mapped into the physical memory space of the hardware memory as a PPN.

The addressable space of the disk(s), and therefore also of the virtual disk(s), is similarly subdivided into separately identifiable portions such as blocks or sectors, tracks, cylinders, etc. In general, applications do not directly address the disk; rather, disk access and organization are tasks reserved to the operating system, which follows some predefined file system structure. When the guest OS wants to write data to the (virtual) disk, the identifier used for the intended block, etc., is therefore also converted into an identifier into the address space of the physical disk. Conversion may be done within whatever system-level software layer that handles memory, disk and/or file system management for the VM and other processes.

From time to time, it may become necessary or desirable to migrate a virtual machine from one host to another. Consider, for example, the situation illustrated in FIG. 1B, where a server 100, embodied as a virtual machine 102 executing on a host 104, is subject to a surge in requests 107 over a network 108 from clients 106a, 106b, 106c, giving rise to contention for access to the physical resources of host 104, such as CPU time and memory space. To alleviate these contention problems, and provide load-balancing across physical hosts, it may be desirable or necessary to replicate the virtual machine 102, by migrating it to a second host 110 over the network 108, and, if necessary, transparently redirecting at least a portion 114 of the client requests to the second host 110 for handling. In FIG. 1B, the migrated copy of the virtual machine 102 as hosted by the second host 110 is identified with numeral 102'.

Another example is the case where, to perform preventative maintenance, it is necessary to take down a physical host to upgrade the hardware and/or software. To accomplish this, it would be useful to migrate all the virtual machines executing on the host to another host during this maintenance time. A third example is where an end user desires to seamlessly carry out work assignments on both work and home computers. To facilitate this, it may be useful to implement both computers as a virtual machine, with the work computer acting as one host and the home computer acting as another. The virtual machine may then be migrated from one host to another to track the mobility patterns of the end user. For example, during a work day, the virtual machine could be hosted by the work computer, and then, at the end of the work day, migrated to the home computer, allowing the end user to seamlessly resume his work assignments upon his arrival at home.

A virtual machine has state, which must be transferred in order to achieve a successful virtual machine migration. The state of a virtual machine includes its guest physical pages.

A problem thus arises because the collection of guest physical pages of a virtual machine typically ranges in size from hundreds of megabytes to several gigabytes, which can take hours to transfer across the Internet between distinct geographic locations at current network transmission rates. Since that is far too long for many applications, efforts have focused on reducing the amount of data that needs to be transmitted to achieve efficient virtual machine migration. For example, in Constantine P. Sapuntzakis et al., "Optimizing the Migration of Virtual Computers," Proceedings of the Fifth Symposium on Operating System Design and Implementation, December 2002, the authors advocate four optimization techniques for reducing the amount of data that must be transferred in the course of performing virtual machine migration: copy-on-write, demand paging, ballooning, and hashing.

In copy-on-write, a copy-on-write disk is used to capture updates to the state of the virtual machine since the last transfer. The amount of data needed to achieve virtual machine migration is reduced because only data representing updates to the virtual machine state since the last transfer must be transferred to achieve virtual machine migration.

In demand paging, only those guest physical pages that are actually demanded by active processes in a virtual machine, and are therefore resident in the source host's cache or primary memory, are transferred. These pages, which can be referred to as the resident portion of the virtual machine, are easily identified as they have been paged or faulted into the host's cache or primary memory as the processes execute, while pages that have not been demanded remain in a secondary host location, typically disk storage. The remaining pages resident in the secondary host are not transferred, it being assumed that the secondary host storage for the source host will be accessible to the destination host.

In ballooning, the host operating system is tricked into reclaiming physical host memory from existing processes by running a balloon program that requests a large number of physical pages. Once reclaimed, the pages are then zeroed out, and then compressed, thus reducing the amount of data that needs to be transferred. Alternately, the reclaimed pages are swapped out to secondary storage, and only the pages remaining in the primary host memory are transferred. Again, the data needing to be transferred is reduced, albeit through a different mechanism.

Finally, in hashing, the sender, rather than sending pages, sends hash identifiers, determined by applying a predetermined hash function to the page contents. If the receiver locates a page on local storage that has the same identifier, it copies or utilizes the page from the local storage. Otherwise, it requests the page from the sender. The number of pages needing to be transferred is reduced by the number of pages that are determined, through matching of hash identifiers, to already be present at the destination.

The common thread underlying all of these techniques is a focus on reducing the amount of data that needs to be transferred. However, none address the equally or more significant problem of avoiding or reducing the pressure for memory at the destination host arising from the transfer. For example, regardless of whether the data is compressed or otherwise reduced in some manner, with each of these techniques, the entire resident portion of the virtual machine will still have to be accommodated in a cache or primary host memory at the destination host. If this memory is unavailable, the transfer will induce a lot of memory swapping or reclaiming at the destination host, thereby degrading system performance, no matter how much the data is compressed or reduced for purposes of the transfer.

In addition to this, one or more of these techniques has certain failings, limitations or restrictions so far as compression or data reduction is concerned. For example, copy-on-write requires that updates to the virtual machine state since a prior transfer be identified and distinguished from the remainder of the virtual machine state.

Ballooning assumes that pages in the cache or primary memory are available for reclaiming. If such is not the case, then ballooning will be ineffective for purposes of data compression or reduction.

Finally, hashing assumes that hash collisions, i.e., the situation where distinct pages with different contents map to the same page identifier, can be tolerated. However, the consequences of hash collisions are often severe, not to say catastrophic, as corrupting the contents of a page can cause a virtual machine to crash, lose data, or otherwise fail. Therefore, hashing, unaccompanied by a mechanism to avoid hash collisions, usually involves unacceptable risk. One way to reduce the risk, that is, the probability of a collision, is to use larger hashes, but this solution consumes more space, is more costly to compute, and still requires some additional mechanism to completely eliminate the risk.

In light of the foregoing, there is a need for a method of more efficiently migrating a virtual machine from a source host to a destination host by overcoming one or more problems of the prior art.

SUMMARY OF THE INVENTION

The invention provides a system and related method of operation for migrating, at least in part, a virtual machine from a source to a destination, where the source and destination may be separate host computers or, in one embodiment, different components of the same computer system. The virtual machine has an address space, each of one or more portions (such as pages) of which has content uniquely associated at the source with a signature that, absent disambiguation, may collide with different content at the destination, wherein the source is configured to make available one or more of said signatures to the destination.

The signature(s) are disambiguated (either in the source or in the destination or in both) so that each disambiguated signature may be uniquely associated with content stored in a storage device (volatile or non-volatile) at the destination and that is also arranged into separately addressable portions such as pages, and so that collisions with different content are avoided at the destination.

If the content uniquely associated with a disambiguated signature in the destination is already present, one or more portions of the address space of the virtual machine having the content is backed in destination host memory (or, in one case, disk, with storage portions already holding said content).

Preferably, each signature is a hash identifier derived by applying a predetermined hash function to the associated content. The signatures may be produced as a byproduct of a page-sharing program executing on either the source or the destination.

The signature may be sent from the source to the destination along with its associated content. If the content associated to the signature has already been sent, however, or is otherwise know to be resident in the destination, then the signature can be sent alone; the invention provides for a flagging arrangement to indicate this situation.

The migration method is also applicable where the process of migrating the virtual machine is in conjunction with a suspend/resume operation for the VM.

DETAILED DESCRIPTION OF THE INVENTION

The present disclosure will now be described more fully with reference to the Figures in which various embodiments of the present invention are shown. The subject matter of this disclosure may, however, be embodied in many different forms and should not be construed as being limited to the embodiments set forth herein.

Figure 1A:
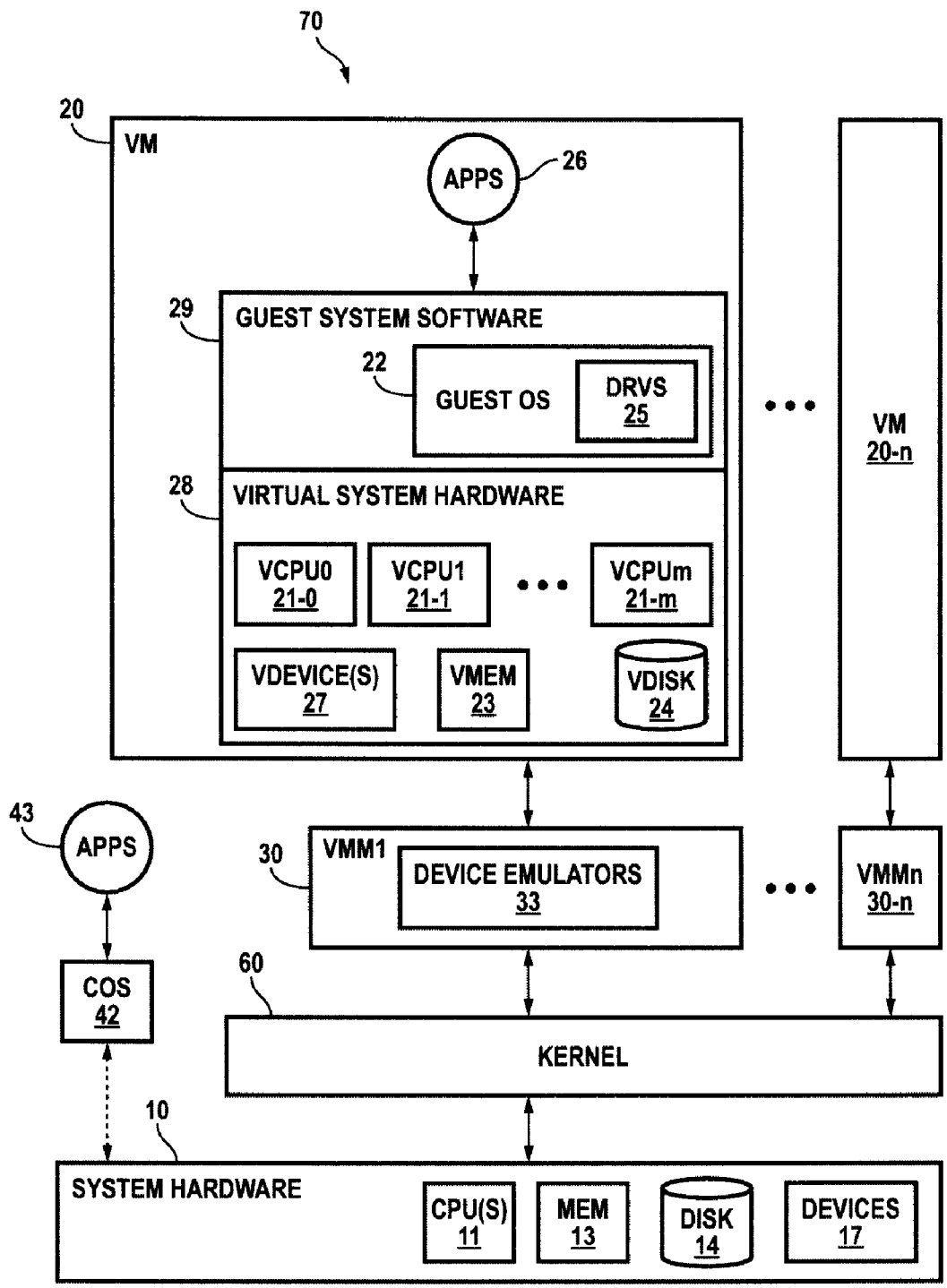
FIG. 1A is a diagram illustrating the components of one embodiment of a non-hosted virtualized computer system.
Figure 1B:
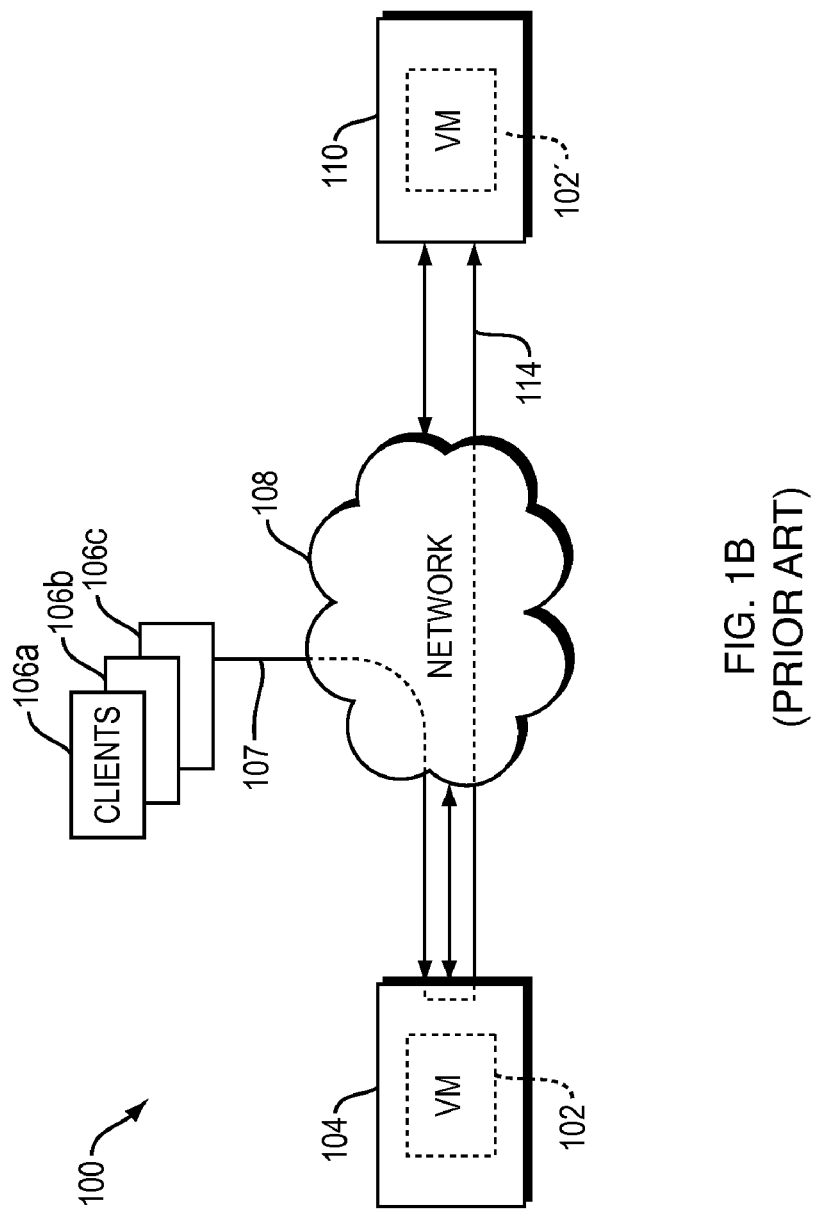
FIG. 1B is a diagram showing migration of a virtual machine from a first server to a second server for purposes of load-balancing or as otherwise required by a management policy.
Figure 2A:
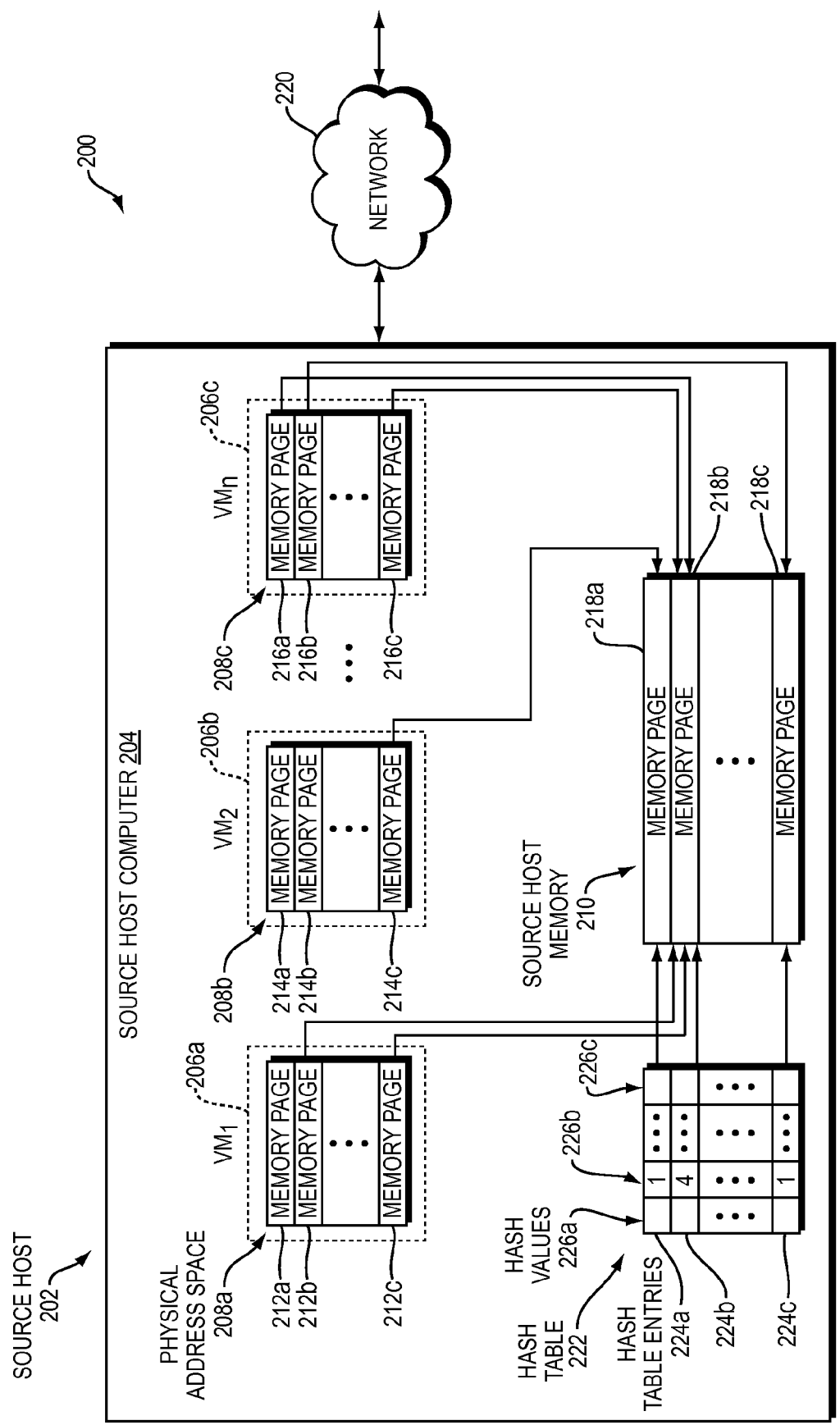
FIGS. 2A-2B together are a diagram showing an embodiment of a system for migrating a virtual machine, at least in part, from a source host to a destination host.
Figure 2B:
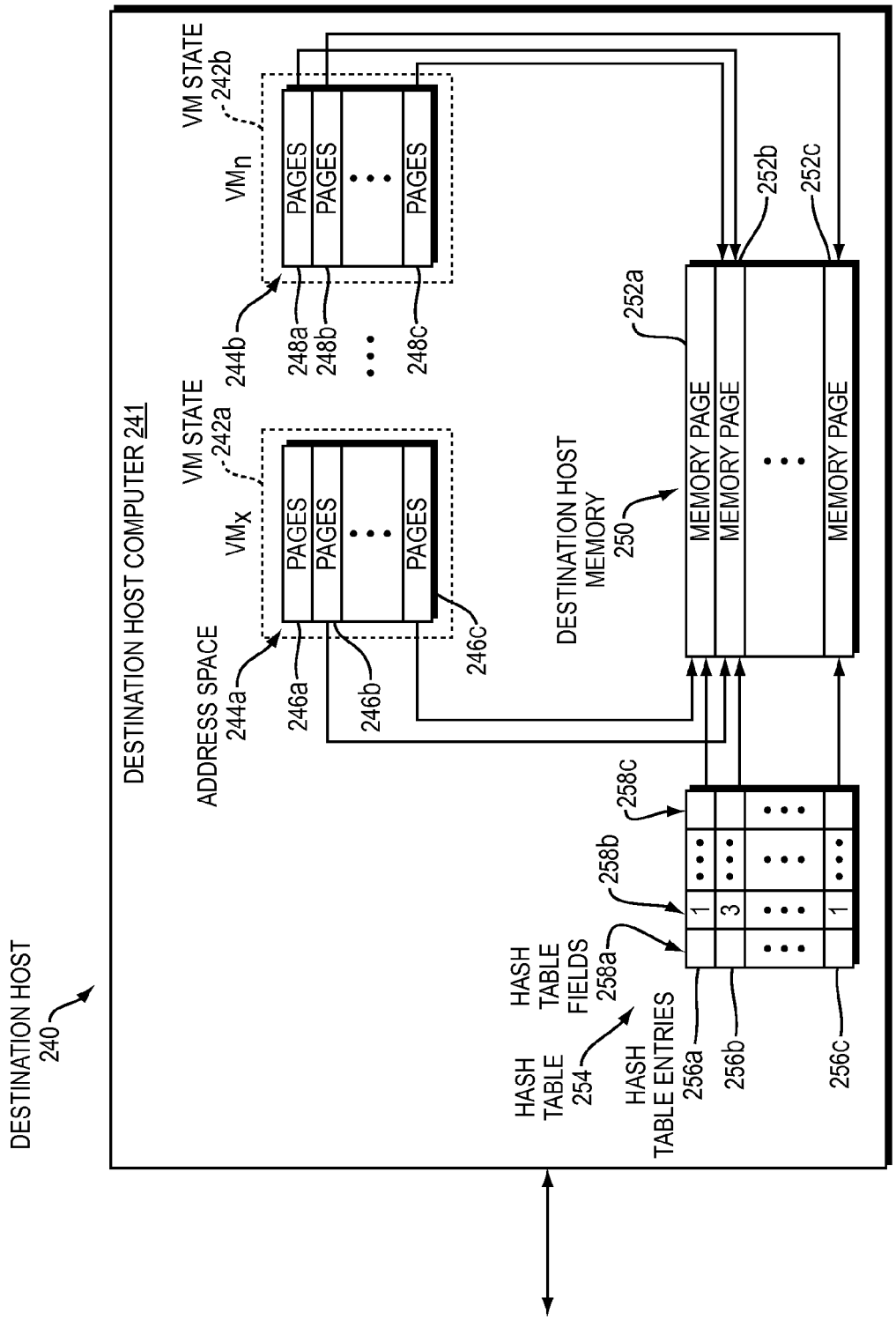

FIGS. 2A-2B show an embodiment of a system 200 for migrating, at least in part, a virtual machine from a source host 202 to a destination host 240 over a network 220. The source host 202 comprises a source host computer 204, which hosts one or more virtual machines, $VM_1$ $VM_2$, ..., $VM_n$, shown in phantom and identified in FIG. 2A with numerals 206a, 206b, 206c, respectively. Each of the virtual machines 206a, 206b, 206c has a guest physical address space 208a, 208b, 208c that is apportioned into pages or other analogous, contiguous, uniformly sized blocks of memory.

From time to time, the virtualization software will usually choose to store the contents of some or all of the respective guest physical address spaces 206a, 206b, 206c of the virtual machines 206a, 206b, 206c in a source host memory 210, which may also be referred to as a cache or primary memory, and which is typically implemented using some form of volatile storage technology, such as system RAM, etc. However, embodiments are possible where the guest physical address spaces may be mapped to portions of non-volatile storage such as a disk, a flash memory, etc.

Because the host memory 210 is usually not large enough to hold the guest physical address spaces 208a, 208b, 208c of all of the virtual machines 206a, 206b, 206c at the same time, the virtual machines 206a, 206b, 206c usually compete for use of the host memory 210. One or more components of the virtualization software executing on the source host computer 204 are typically provided to resolve these competing requests by deciding which portions, if any, of the guest physical address spaces 208a, 208b, 208c of the virtual machines 206a, 206b, 206c can be stored in the source host memory 210 at a particular time. The system 200 typically includes secondary storage (not shown), such as flash memory or disk storage, for holding those portions of the guest physical address spaces 208a, 208b, 208c for each of the virtual machines 206a, 206b, 206c that cannot be accommodated in the source host memory 210 at a given time.

A page-sharing program within the virtualization software may attempt to alleviate contention for the source host memory 210 by identifying pages of the guest physical address spaces 208a, 208b, 208c of the virtual machines 206a, 206b, 206c that have identical contents, and then mapping those pages to (backing these pages by) the same page of the source host memory 210. Examples of such a program are described in Carl A. Waldspurger, "Memory Resource Management in VMware ESX Server," Proceedings of the Fifth Symposium on Operating Systems Design and Implementation (OSDI '02), Boston, Mass., December 2002; U.S. Pat. Nos. 6,789,156; and 6,075,938, each of which is hereby fully incorporated by reference herein as though set forth in full.

Page-sharing is beneficial because it tends to allow a host to execute a greater number of virtual machines concurrently, and also tends to allow for more efficient operation by necessitating fewer instances of swapping between the primary or cache host memory and secondary storage. Consider the example shown in FIG. 2A, which illustrates the guest physical address spaces 208a, 208b, 208c of the virtual machines 206a, 206b, 206c, respectively, in the system 200 at a particular time. In this particular example, the virtualization software is configured to map identical pages of the same or different guest physical address spaces 208a, 208b, 208c to the same page of the host memory 210. As illustrated, pages 212b and 212c of address space 208a, and pages 216a and 216c of address space 208c, have identical contents, and are therefore mapped to the same page 218b of the source host memory 210 through conventional page mapping tables (not shown). Compared to the case where these pages are mapped to different pages of the source host memory 210, the approach of mapping these pages to the same page of the source host memory 210 frees up pages for use by another virtual machine or other process running on the same host.

The concept of a "signature" is used in this invention. Here, a "signature" for a page (or whatever memory unit is considered) is the result of one or more operations performed on information (usually, but not necessarily limited to, the contents) of the page intended to uniquely identify the page. In general, the signature should be able to be represented using fewer bytes (or bits, etc.) than are needed for the contents of the page itself, since otherwise it would be easier simply to use the page's contents directly as its own "identifier." Thus, for a 4 k-byte page, the signature should preferably consist of fewer than 4 k bytes. In other words, the signature represents a reduced-dimensionality mapping.

The problem with such mappings is that they introduce ambiguity due to the possibility of collisions. For example, if there are eight balls that are each to be colored with one of only three different colors, then at least two balls must have the same color. In fact, if there is any number of colors fewer than eight, at least two balls will have to have the same color.

As another example, consider a common checksum, in which a sequence of numbers, including the digits (including binary digits) of a single number, are summed to create a single- (and sometime multi-) number check. As a simplified example, if checksum(x) is defined as the sum of the digits of whole number x (many other definitions are possible, although all by definition involve some sum of some form of numbers), then checksum(20070212)=(2+0+0+7+0+2+1+2)=14. The problem is that, without more information, it is not possible to know which number led to a particular checksum if two possible starting numbers have the same checksum. Thus, checksum(20031116)=14, although 20031116 is different from 20070212. In other words, a collision arises from these two numbers and this definition of checksum(x).

Note, however, that signatures generally do correctly identify when there is not a match. Thus, if the checksum defined as above by way of example gives a value of 11, then one can be certain that the starting number was neither 20031116 nor 20070212.

In other words, if the number of identifiers is less than the number of things to be identified, then there will be at least one identifier (and may be many more) that does not uniquely identify the thing it's associated with—there will be at least one collision. To uniquely figure out (to disambiguate) which thing one is presented with, that is, to resolve a collision, one needs additional information.

Many different types (or combinations) of signatures may be used in this invention to identify memory pages to within an acceptable degree of ambiguity. The chosen signature will be a design choice within the skill of programmers who understand memory management techniques. A by no means exhaustive list of examples of possible signatures includes any type of checksum and any of the many types of hashing algorithms.

Because of their known effectiveness, hashing algorithms are the preferred way to create signatures in this invention. For this reason, the discussion of the invention below implements signatures using hash values and a corresponding hash table, but it should be understood that this is by way of example only. Just a couple examples of the hash functions that may be used in the invention include the SHA-1 (Secure Hash Algorithm) or MD5 (Message Digest) hashes.

In the course of identifying shared pages (or potentially shared pages) in the guest physical address spaces 208a, 208b, 208c, the page-sharing program within the virtualization software according to the invention may thus use a data structure, for example, a hash table 222, having a plurality of entries 224a, 224b, 224c, each associating a page signature, in this case, a hash value 226a, 226b, 226c, derived by applying a predetermined hash function to the page contents, to one of the allocated pages 218a, 218b and 218c of the source host memory 210. The source and destination hosts preferably use the same hash function.

The page-sharing program may also utilize this data structure to locally resolve, i.e., within the host 202, hash collisions such as might arise by using a hash value as a signature to represent a page. More specifically, because a hash value usually represents a page with less data than the page contents, e.g., 8 bytes vs. 4K bytes, there will almost always be a risk of a hash collision, i.e., the same hash value being used to represent a page with different contents. To avoid or eliminate this risk, at least locally within the host 202, the page-sharing program may only allow one entry to be placed into the hash table 222 at a time associating a particular hash value with page contents. Any attempt to add another entry associating this same hash value with different page contents is blocked. That way, the hash table uniquely associates hash values with page contents. In one embodiment, the page-sharing program follows the convention that the first entry placed into the hash table 222 associating a particular hash value with page contents blocks subsequent entries attempting to associate that same hash value with different page contents. In this particular embodiment, the page contents associated with these blocked entries cannot be shared, although it should be appreciated that these page contents may still be stored in the host memory 210 as needed to back a corresponding page of like contents in a guest physical address space of a virtual machine.

In the particular embodiment illustrated, each of the entries 224a, 224b, 224c has a plurality of fields 226a, 226b, 226c, containing various items of information, such as, in one particular example, the hash value of the page, stored in field 226a, derived by applying a predetermined hash function to the contents of the page, a reference count, stored in field 226b, containing a count of the number of guest physical pages that are backed by the same corresponding page 218a, 218b, 218c in the source host memory 210, and a pointer, stored in field 226c, to the backing page 218a, 218b, 218c in the source host memory 210. A fourth field (not shown) may contain a flag that is normally clear, but, when set, indicates that the corresponding page 218a, 218b, 218c in the host memory 210 has been assigned a read-only status, for example, because it is shared by more than one guest physical page in the same or different guest physical address space 208a, 208b, 208c—note that a shared page is generally set "read only," since otherwise one process writing to the single shared page might make a change that is inconsistent with the assumptions of other processes sharing the same page.

The source host computer 204 is configured to migrate a selected one or more of the virtual machines 206a, 206b, 206c to the destination host 240 over network 220, which interconnects the source host 202 and the destination host 240, and which may be a wireless network, a wireline network, or a combination wireless and wireline network. To accomplish this, the source host computer 204 is configured to transfer the state of the selected one or more virtual machines 206a, 206b, 206c to the destination host 240. In one embodiment, this state comprises the resident portion of the guest physical address space 208a, 208b, 208c of the selected one or more virtual machines 206a, 206b, 206c, i.e., the portion stored in the host memory 210 and/or the portion for which an entry exists in hash table 222, although it should be appreciated that embodiments are possible wherein the state that is transferred includes the entirety of the guest physical address space 208a, 208b, 208c of the selected virtual machine 206a, 206b, 206c, i.e., including any portion stored in the secondary storage and any portion for which an entry is not present in the hash table 222. Upon receiving the state of the selected one or more virtual machines, the destination host 240 recreates the selected one or more virtual machines, thus accomplishing the migration.

The migration may also be achieved in phases, as described in Michael Nelson et al., "Fast Transparent Migration for Virtual Machines," Proceedings of USENIX '05: General Track, Apr. 10-15, 2005, 2005 USENIX Annual Technical Conference, pages 391-394, and U.S. patent application Ser. No. 10/319,217, Michael Nelson, filed Dec. 12, 2002, both of which are hereby fully incorporated by reference herein as though set forth in full. During a first phase, all guest physical address pages for the virtual machine in question are sent from the source host to the destination host. In later phases, only guest pages that were modified since the previous phase are sent. In one implementation, one complete copy is sent, followed by successive differences, that is, updates reflecting state changes, from the previous transmission, until the differences are small enough to switch execution of the virtual machine from the source host to the destination host. This "pre-copying" of the memory contents of a VM and then updating when needed significantly reduces the downtime of a VM: The amount of uncopied memory on the source can ideally be kept small enough that the remaining uncopied memory can be copied quickly.

Assuming a virtual machine targeted for migration is $VM_n$, identified with numeral 206c in FIG. 2A, the source host computer 204 is configured to examine each page 216a, 216b, 216c in the resident portion of the guest physical address space 208c of $VM_n$, i.e., the portion stored in the source host memory 210 and/or for which an entry exists in hash table 222, and to take various actions depending on the state of the page. The examination can take place sequentially or in parallel. In one embodiment, for each such page, the source host computer 204 is configured to send a page signature, such as the hash value for the page as obtained from hash table 222, to the destination host 240 accompanied by the page contents uniquely associated with the signature by the hash table 222. The presence of the page signature in this transmission signals the destination host 240 that the page was shared or a candidate for sharing at the source host 204, and so therefore may also be shared or a candidate for page-sharing at the destination host 240. The page contents are sent along with the page signature in this embodiment in order to disambiguate the page signature at the destination host, i.e., to avoid or eliminate the risk of hash collisions with different content at the destination host 240. Absent disambiguation, that risk is present because, while the hash table 222 avoids that risk locally within the source host 202, it does not do so for the destination host 240 (since the two hosts will typically not coordinate on what pages they add to their respective hash tables). That risk is avoided in this embodiment by sending each page signature along with its associated page contents.

If the page is resident in the secondary storage, for example, is not part of the resident set of the virtual machine, in this particular embodiment, the source host computer 204 is configured to send neither a page signature nor the page contents to the destination host 240, it being assumed that the destination host 240 can access the secondary storage and obtain such pages directly. Instead, an indication that the page is swapped is transmitted, including an identifier of the disk location where the page is stored. If the page is resident in the source host memory 210, but does not have a corresponding entry in the hash table 222, in this particular embodiment, the page contents alone are sent, unaccompanied by a page signature. The presence of the page contents only signals the destination host 240, in this particular embodiment, that the page, although part of the resident portion, is neither shared nor a candidate for sharing at the source host 202.

Turning now to FIG. 2B, the destination host 240 comprises a destination host computer 241, and a destination host memory 250. The destination host 240 is configured to receive the state of $VM_n$, as transferred from the source host 202, and recreate $VM_n$ (identified in FIG. 2B with numeral 242b) on the destination host computer 241 using this state information. As part of that process, the destination host computer 241 is configured to recreate the guest physical address space 208c of $VM_n$ (identified in FIG. 2B with numeral 244b), or at least the resident portion of this guest physical address space, from the page signatures and page contents transmitted by the source host 222.

The migration of $VM_n$ to the destination host 240 may be preceded or accompanied by the migration of one or more additional virtual machines $VM_n$ to the destination host 240, usually from the same source host, but possibly from a different source host, each having a guest physical address space that may share pages with one another as well as the guest physical address space of $VM_n$. Alternatively, in lieu of being migrated to the destination host 240, $VM_x$ may simply be resident on destination host 240. Accordingly, a page-sharing program may also be provided at the destination host 240 to manage the sharing of pages between the same or different guest virtual address spaces resident on that destination host. In FIG. 2B, it is assumed that the migration of $VM_n$ to the destination host 240 has been preceded by the migration of a virtual machine, $VM_x$, to the destination host 240, where $VM_x$ is shown in phantom and identified with numeral 242a. The guest physical address space for $VM_x$, also shown in phantom, is identified with numeral 244a. The pages in that guest physical address space are identified with numerals 246a, 246b, 246c. As shown, it is assumed that page 246b in the guest physical address space 244a is backed by page 252b in the destination host memory 250, and that page 246c in the guest physical address space 244a is backed by page 252a in the destination host memory 250.

In the course of identifying shared pages (or potentially shared pages) in the guest physical address spaces 244a, 244b, the destination's virtualization software may refer to a data structure, for example, a hash table 254, which may be identical in format to hash table 222 used by the virtualization software executing on the source host 202. As shown, the hash table 254 comprises a plurality of entries 256a, 256b, 256c, each uniquely associating a page signature, for example, a hash value, stored in field 258a, with one of the allocated pages 252a, 252b, 252c in the destination host memory 250. In the case where the destination host 240 uses hash values to identify pages, the hash function used by the destination host 240 should be the same as that used by the source host 202. In the particular embodiment illustrated, each of the entries 256a, 256b, 256c has a plurality of fields 258a, 258b, 258c, with the hash value for the page stored in field 258a, a count of the number of guest physical pages backed by the corresponding page 252a, 252b, 252c in the destination host memory 250 stored in field 258b, and a pointer to the allocated backing page 252a, 252b, 252c in the destination host memory 250 stored in field 258c. Additional fields may be provided, such as a field containing a flag, normally clear, that, when set, indicates that the corresponding page 252a, 252b, 252c in the destination host memory 250 is read-only because it backs more than one page in the same or different guest physical address space of a virtual machine resident on the destination host 240. Of course, additional or fewer fields are possible, so nothing in the foregoing description should be taken as limiting. As with hash table 222, hash table 254 avoids the risk of hash collisions locally within destination host 240 by only allowing one entry associating a particular hash value with page contents, and blocking any attempt to add any additional entry associating the same hash value with different page contents.

In this embodiment, to recreate the resident portion of the guest physical address space 244b of $VM_n$, logic within the destination host 240, for example, the programmed destination host computer 241, utilizes the transmissions of page signatures and associated page contents from the source host 204. For each such transmission, the destination host computer 241 creates a page in the guest physical address space 244b and then it goes about deciding how to back that page in the destination host memory 210. Note that it is not necessary to maintain a data structure to map source GPPNs to destination GPPNs, since the source and destination physical address spaces are generally identity-mapped, that is, the same. To back the GPPN, in the case where a page signature sent from the source host 202 is accompanied by its associated page contents, the destination host computer 241 first compares the page signature from the transmission with the page signature field (field 258a) in the entries of hash table 254 to determine if there is a matching entry.

If there is a matching entry, the destination host computer 241 then compares the associated page contents from the transmission with the associated page contents from the matching hash table entry, i.e., the already-allocated page in the destination host memory 210 pointed to by field 258c. If the contents match, the destination host computer 241 backs the page in the guest physical address space 244b of the virtual machine $VM_n$ with the already-allocated page in the destination host memory 250, thus alleviating pressure on the destination host memory 250 arising from the transfer; in other words, if it is possible for two guest pages to share a host memory page, then it is shared, which eliminates the need to use up another page of host memory to create a "duplicate" page.

If the page signature does not match an entry in hash table 254, or the signature matches but the page contents do not match, the destination host computer 241 backs the page with a newly allocated page in the destination host memory 250, which will trigger a new entry in the hash table 254, assuming an entry associating that signature with different contents is not already present in the hash table 254. If such an entry is present, the page is backed by a newly allocated page, but a new entry is not added to the hash table 254 for the newly allocated page. Instead, an entry associating the signature with the page contents is added to a per-migration "collisions" data structure (further described below). In summary, there are three cases and actions taken: 1) the hash table contains the signature and the signature matches: In this case, the page can simply be shared with the hash table entry for that signature; 2) the hash table has the signature but the signature does not match: a new page must be allocated; and 3) the hash table does not have the signature: A new physical page is allocated and the signature is added to the hash table.

In the case of page contents unaccompanied by a page signature, the destination host computer 241 could derive the page signature for such a page on the fly, and then attempt to share the page, by checking to see if there is a matching entry in hash table 245, and matching page contents. Again, if the page signature is a hash, the same hash function should be used at the source and destination hosts 202, 240. If the page contents match, then the destination host computer 241 can share the page, by backing it with an already-allocated page in the destination host memory 250.

In the foregoing description, it is assumed that logic in the form of a programmed destination host computer 241 performs the tasks of recreating the guest physical pages of the virtual machine $VM_n$ on the destination host 240, and backing these pages in the destination host memory 250, but it should be appreciated that embodiments are also possible where these tasks are performed in hardware, or combinations of hardware and software. Therefore, for purposes of this disclosure, the term "logic" means hardware, software, or any combination of hardware and software.

A specific example of the process of migrating the resident portion of the guest physical address space 208c of $VM_n$ from the source host 202 to the destination host 240 in accordance with this first embodiment will now be described in detail.

Turning to FIG. 2A, at the source host 202, the source host computer 204 examines each of the pages 216a, 216b, 216c in the resident portion of the guest physical address space 208c of the virtual machine to be migrated ($VM_n$). The examination could take place in series or in parallel. Source host computer 204 first examines page 216a. Through an access to entry 218b of hash table 222, source host computer 204 identifies page 216a as a shared page (reference count=4) that is backed by a corresponding page (page 218b) in the source host memory 210. Accordingly, in addition to page contents, the source host computer 204 transmits a signature of page 216a, that it may obtain from an access to hash table 222 (field 226a of entry 224b). Alternatively, the source host computer 204 may derive the page signature on the fly from the page contents.

Next, the source host computer 204 examines page 216b. Assume that the contents of page 216b hash to a value that points to entry 224c of hash table 222. The source host computer 204 thus identifies page 216b as a page that is backed by a corresponding page (page 218c) in the source host memory 210, and, although currently unshared (reference count=1), is a candidate for sharing at the source host 202. Accordingly, source host computer 204 transmits a page signature for page

216c, which it may obtain through an access to hash table 222 (field 226a of entry 224c), or which it may derive on the fly from the page contents.

Next, after processing any intermediate pages, the source host computer 204 examines page 216c. Assume that the contents of page 216c hash to a value that points to entry 224b of hash table 222. The source host computer 204 thus identifies page 216c as a shared page (reference count=4) that is backed by a corresponding page (page 218b) in the source host memory 210. Accordingly, in addition to page contents, the source host computer 204 transmits a signature of page 216c, which it may obtain through an access to hash table 222 (field 226a of entry 224b), or that it may derive on the fly from the page contents.

Turning to FIG. 2B, the functioning of the destination host computer 241 in this example will now be described. Upon receipt of the page signature and page contents for page 216a, the destination host computer 241 creates a page, page 248a, in the guest physical address space 244b for $VM_n$, and then it checks hash table 254 to see if the signature for page 216a matches field 258a of any of the entries of hash table 254. Finding a match with entry 256b, the destination host computer 241 then compares the contents of page 216a as transmitted with the contents of page 252b, the already-allocated page in the destination host memory 250 that corresponds to the matching entry 256b. Finding a match in page contents as well, the destination host computer 241 then backs page 248a with the already-allocated page (page 252b) in the destination host memory 250. It then updates the count, in field 258b, of the total number of shared pages backed by page 252b, from one to two. (Note: FIG. 2B shows a static view of table 254 at the conclusion of all updates, that is, after a subsequent update from two to three.).

Upon receipt of the page signature and contents for page 216b, the destination host computer 241 creates a page, page 248b, in the guest physical address space 244b for $VM_n$, and then it checks hash table 254 to see if the signature for page 216b matches field 258a of any of the entries of hash table 254. Finding no such match (entry 256c would not yet have been created), the destination host computer 241 allocates a new page (page 252c) in the destination host memory 250 that it fills with the transmitted page contents, and then it backs page 248c with this newly allocated page. It then creates a new entry, entry 256c, in hash table 254 for this newly allocated page.

After processing any intermediate pages, upon receipt of the page signature and page contents for page 216c, the destination host computer 241 creates a page, page 248c, in the guest physical address space 244b for $VM_n$, and then it checks hash table 254 to see if the signature for page 216c matches field 258a of any of the entries of hash table 254. Finding a match with entry 256b, for example, the destination host computer 241 then compares the contents of page 216c as transmitted with the contents of page 252b, the already-allocated page in the destination host memory 250 that corresponds to the matching entry 252b. Finding a match in page contents as well, the destination host computer 241 then backs page 248c with the already-allocated page (page 252b) in the destination host memory 250. It then updates the count, in field 258b, of the total number of shared pages backed by page 252b, from two to three (as illustrated in FIG. 2B).

In a second embodiment of the system 200, with one exception, the same process as described above is employed to migrate pages. The one exception is for pages whose content has already been transmitted to the destination host 240 and uniquely associated there with the page signature. For such pages, a different process for disambiguation is employed than in the first embodiment. Rather than transmitting the page contents along with the page signature, for such pages, the page signature is identified, for example, through the setting of a flag that accompanies the signature, as one whose associated contents have already been transmitted to the destination host 202 and uniquely associated there with the page signature. This additional information is sufficient to disambiguate the signature from the standpoint of the destination host 240.

Consider, for example, the handling of pages 216a and 216c in the system 200 in this second embodiment. These pages are shared intra-VM pages at the source host 202. At the time page 216c is encountered in the migration process, the signature and contents of page 216a would have already been transmitted to the destination host 240 and uniquely associated there, through entry 258b in hash table 254, with the signature of page 216a (and therefore page 216c). The page-sharing programs executing on the source and destination hosts 202, 240 ensure this association is unique at both locations.

Therefore, to migrate page 216c, only the signature of page 216c need be transmitted, along with an identification (for example, a flag setting) that the page is an intra-virtual machine shared page whose contents have already been transmitted to the destination host 240 and uniquely associated there with the page contents as part of the same virtual machine migration process. Given such information, the destination host 240 is able to process page 216c without the need for the page contents to be transmitted. Rather, the destination host 240 need only determine that there is a matching entry, entry 256b, in the hash table 254 for the signature for page 216c. Based on this match alone, the destination host computer 241 is then able to back the corresponding page 248c in the guest virtual address space 244b of $VM_n$ with the already-allocated page 252b corresponding to the matching entry 256b. There is no need to perform another comparison of the page contents before performing this backing, because it is enough in this particular example that the page signatures match. Again, that is because the page signature has already been uniquely associated with the contents at the source host 204 (through entry 224b of hash table 222), and this unique association has been moved to the destination host 240 (as entry 256b in hash table 254).

A special case exists when this unique association cannot be moved to the hash table 254, for example, because of a collision with an existing entry. In this case, upon the receipt of the page signature and contents for page 216a, the destination host computer 241 would maintain the association between the two through an entry in a separate per-migration or per-source host "collisions" data structure. Upon encountering the signature for page 216c, along with the indication that the signature is one whose content has previously been transmitted to the destination host 240, and uniquely associated there with the signature, the destination host computer 241 would first check the collisions data structure, and find a matching entry. Based on this match, the destination host computer 241 would back the corresponding guest physical page (page 248c) with a newly allocated page in the destination host memory 250, filling the contents of that page with the page contents as obtained from the matching entry in the collisions data structure. Although collisions will typically be rare enough that more complicated data structures for the hash table will be inefficient, it would also be possible to implement the hash table, for example, such that its buckets include pointers to different colliding pages, with different sharing counters for each page.

If for any reason a matching entry is not found in the per migration "collisions" table, then the signature, for example, signature 216c, would be handled as previously described, i.e., the destination host 240 would look for a matching entry in the hash table 254, and back the corresponding guest physical page (page 248c) with the already-allocated page corresponding to the matching entry.

Figure 3:
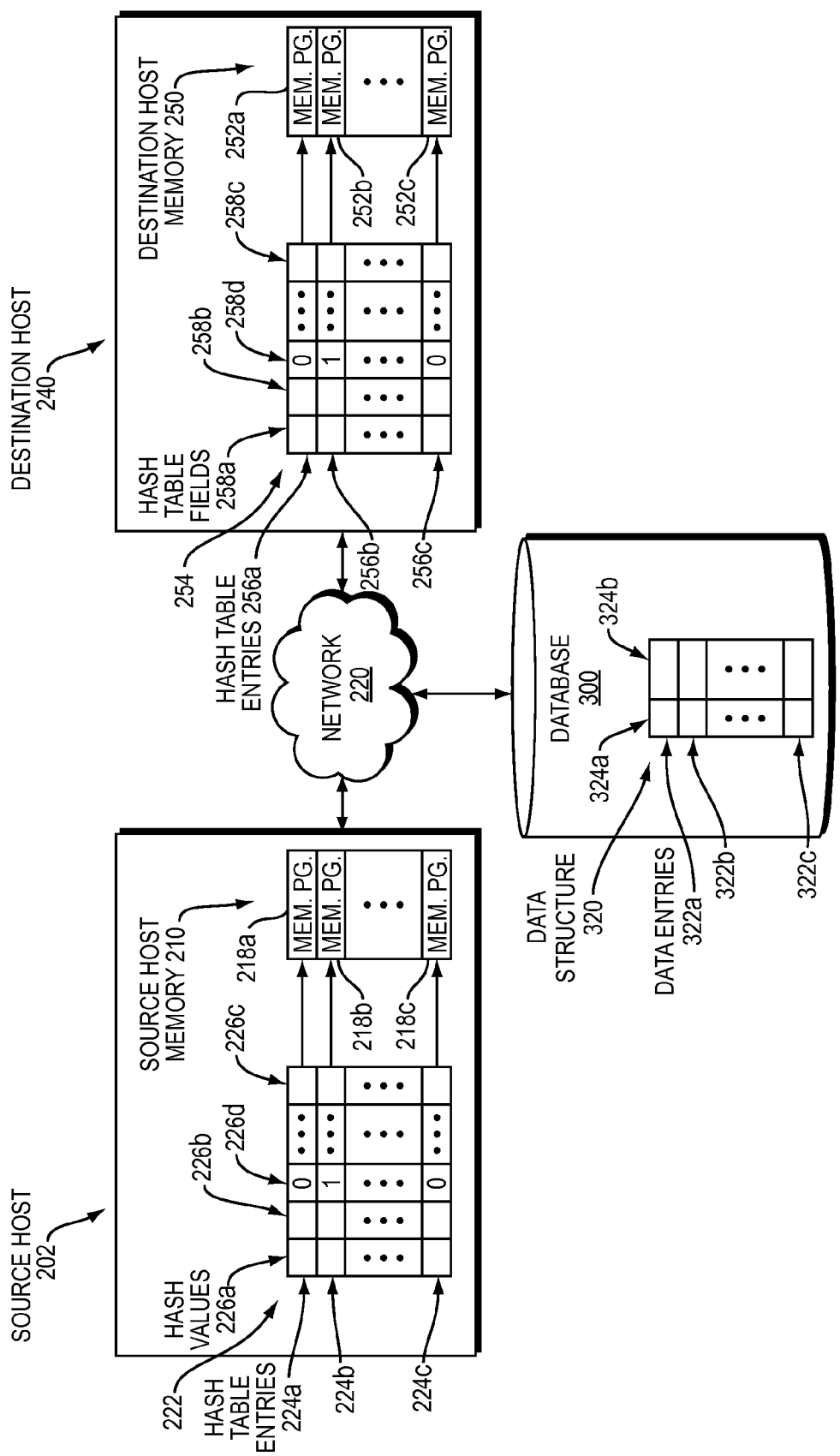
FIG. 3 is diagram of a system for migrating a virtual machine, at least in part, from a source host to a destination host, which includes a database, accessible to both the source and destination hosts.

Turning now to FIG. 3, which omits certain detail shown in FIGS. 2A-2B solely for the purposes of clarity, a third embodiment of the system 200 is illustrated. In this embodiment, each entry in hash tables 222 and 254 is augmented with an additional field, field 226d in hash table 222, and field 258d in hash table 254, for holding a "standard" flag that is normally clear, but, when set, indicates that the corresponding page contents match "standard" contents stored in and uniquely associated with the page signature in a "standard" database 300, accessible at least to the source and destination hosts 202, 240 over network 220. In lieu of augmenting the signature with a Boolean flag, an embodiment is also possible where the signature is augmented with an identifier identifying or specifying a particular database, uniquely associating page signatures with "standard" contents, selected from a plurality of similar such databases. Such an embodiment is described further below.

The database 300 includes any known data structure 320 having a plurality of entries 322a, 322b, 322c, each associating a page signature, for example, a hash value, stored in field 324a, with "standard" page contents 324b. Each association is unique in that only one entry is allowed in data structure 320 associating a particular page signature with corresponding page contents. As with the hash tables 222, 254, once an entry is present in the data structure 320 associating a particular page signature with page contents, all further entries attempting to associate that page signature with different contents are blocked. The associated page contents in data structure 320 are referred to as "standard" page contents, solely to distinguish them from different page contents that have the same page signature.

The database 300 is preferably indexed by page signature. In an access request from a host, the database 300 would be queried with a page signature. In response, it would either indicate there is no matching entry, or else, would provide the "standard" page contents for the matching entry.

The data structure 320 may be populated through a variety of mechanisms. In one embodiment, the data structure 320 is initially populated through an off-line process executing on the source host computer 204, the destination host computer 241, or some other host computer. This off-line process accesses the hash tables 222, 254 resident on the source and destination hosts 202, and 240, and initially populates the data structure 320 with the entries from these hash tables, while avoiding collisions that may arise from time to time between these entries. For example, to avoid collisions, the off-line process may simply follow the same convention followed by the page-sharing programs in the source and destination hosts 202, 240, whereby the first entry in the data structure 320 for a given page signature blocks all subsequent entries attempting to associate that page signature with different contents. It should be appreciated that the off-line process may also initially populate the data structure 320 with page-sharing hash table entries in other hosts besides source and destination hosts 202, 240, such as hosts that are part of a cluster of hosts that have access to and share database 300.

In this particular embodiment, after being initially populated, the data structure 320 may be incrementally populated through an on-line process that adds entries to the data structure 320 upon the occurrence of predefined triggering events, for example, when new pages are shared or identified as candidates for sharing at either the source host 202, the destination host 240, or some other host in a cluster of hosts serviced by the database 300. In one approach, a triggering event occurs whenever a new entry is added to any one of the page-sharing hash tables in this cluster of hosts. At that time, a new entry comprising the page signature and a pointer to the associated page contents (or the contents themselves) is added, absent a collision with an existing entry, to the data structure 320.

Once the data structure 320 has at least been initially populated, one or more processes (either synchronous with the migration process or asynchronous from it) begins executing, either on the source host computer 204, the destination host computer 241, or another host computer in the cluster of hosts serviced by the database 300. The purpose is to compare the contents of shared pages, or pages that are candidates for sharing, with the "standard" page contents as maintained in the data structure 320. In this particular embodiment, the process runs completely independently of the migration process itself.

In one embodiment, the background process checks randomly selected entries in the page-sharing hash tables as maintained on the hosts serviced by the database 300, and checks to see if there is a corresponding entry, i.e., an entry having the same page signature, in the data structure 320. If there is, the background process goes on to compare the page contents corresponding to the matching entry in the hash table with the "standard" contents as maintained on the database 300. If the contents match, then the "standard" flag in the hash table entry is set. If the contents do not match, or there is no entry in the data structure 232 for the page signature, or the background process has not yet checked if the contents match, the "standard" flag in this particular embodiment is kept in the clear state. Thus, in FIG. 3, the "standard" flag for entry 224b in hash table 222 is set, indicating that the corresponding page contents (contents of page 218b) are "standard" page contents, i.e., page contents stored in and uniquely associated with the page signature in the data structure 320. Similarly, the "standard" flag for each of entries 256a and 256c in hash table 254 is set, indicating that the corresponding page contents (contents of pages 256a, 256b, respectively) are "standard" page contents, i.e., stored in and uniquely associated with the corresponding page signature in data structure 320.

In this third embodiment, with one exception, the migration process occurs as described previously in either the first or second embodiments. The exception is the case where a page in the resident portion of the guest physical address space 206c of the virtual machine $VM_n$ to be migrated, such as pages 216a and 216c, has its "standard" flag set. In that case, the migration process sends the signature of the page accompanied only by an indication, for example, a flag setting, indicating the page is a "standard" page. Significantly, the page contents are not sent, at least initially.

The destination host 240, upon receipt of such a signature, creates the guest physical page in the guest physical address space 244b for the virtual machine $VM_n$ being migrated. It then checks to see if there is a matching entry in hash table 254, i.e., an entry whose signature field (field 258a) matches the transmitted signature. If there is such a matching entry, and the "standard" flag for the matching entry is set, then the guest physical page is backed by the already-allocated page in the destination host memory 250 corresponding to the matching entry in the hash table 254. Thus, for example, in FIG. 3, the destination host computer 241, upon receipt of the signature of page 216c, along with an indication that the page contents are "standard" page contents, checks hash table 254 for a matching entry. Finding such an entry in the form of entry 256b, whose "standard" flag is also set, the destination host computer 241 then backs page 248c, the guest physical page on the destination host 240 that corresponds with page 216c, with the already-allocated page (page 252b) that corresponds with the matching entry 256b.

If a matching entry in hash table 254 is not found, or a matching entry is found whose "standard" flag is clear, then destination host computer 241 checks a per-migration "collisions" data structure for the contents. Alternatively or additionally, it requests the contents from the source host 202, or accesses database 300 to obtain these contents.

Once it obtains the page contents, the destination host computer 241 resumes processing of the signature. If a matching entry had previously been found in hash table 254, but the "standard" flag was clear, the page contents are compared. If the contents match, then the guest physical page is backed by the already-allocated page in the destination host memory 250, and the page count for the corresponding hash table entry is incremented by one. Additionally, if clear, the "standard" flag for the matching entry in the hash table 254 is set. If the contents do not match, or a matching entry in hash table 254 was not found, then the guest physical page is backed by a newly allocated page in the destination host memory 250. Additionally, a new entry is made in hash table 254 for this newly allocated page, unless there is a hash collision, i.e., an already existing entry in hash table 254 associating the page signature with different contents. If there is a hash collision, then a new entry is made in a per migration "collisions" data structure uniquely associating the page signature with the page contents, if such an entry is not already present.

An embodiment where an additional "verified" flag is added to each entry in the page-sharing tables 222, 254 is also possible. In this embodiment, the "verified" flag for an entry is clear by default, and thereafter set once the background process has checked the corresponding page contents to determine if they are "standard" page contents. This "verified" flag is useful because it allows the background and foreground processes to distinguish between the case where the "standard" flag is clear because the page contents have not yet been checked by the background process, and the case where the "standard" flag is clear because the page contents have been checked, but determined not to be the "standard" page contents. This distinction is useful to the background process because it allows the background process, upon encountering a situation where the "verified" flag is set, to avoid the wasteful process of checking the page contents for that entry again. Without this "verified" flag, there is a risk that the background process would wastefully check the page content for entries whose content has already been checked and determined not to be "standard."

This distinction also allows the foreground migration process to avoid wasteful and unnecessary processing steps. For example, upon encountering a signature from the source host 202 whose corresponding page content is "standard," in the case where the signature matches an entry in hash table 254 whose "standard" flag is clear, but whose "verified" flag is set, the destination host computer 241 can avoid the wasteful process of comparing page contents to determine if sharing is possible. Rather, the destination host computer 241 can conclude that sharing is not possible based on the flag settings alone.

It should also be appreciated that the database 300 can take a variety of forms. In one implementation, rather than being centralized, the database 300 is distributed amongst one or more of the hosts in a cluster of hosts. The database 300 may also take the form of a computer-readable storage medium, such as a DVD, CR-ROM, etc., that can easily be replicated and physically distributed to each of the hosts in the cluster, for example, when the host is initially established or added to the cluster. The database 300 may also be a "thin" database constituted from pre-existing hash tables 222, 254 produced in each host as a byproduct of the page-sharing process, augmented in each entry with one, and possibly two, flags, for example, the "standard" flag and the "verified" flag, both of which have already been defined.

In one implementation, a pair of such flags is added to each page-sharing table entry for each host in the cluster. Although this approach avoids the need to synchronize access to the flags amongst multiple hosts, it is not easily scalable with the number of hosts in the cluster. In an alternative implementation, one pair of flags is added to each entry. Although this approach is scalable with the number of hosts in the cluster, it requires a mechanism for synchronizing access to the flags amongst multiple hosts. Therefore, there are tradeoffs involved in choosing between the two approaches.

In this "thin" embodiment, the background process, which may be referred to as the global page scanner, may be a global process that services the cluster of hosts. In this implementation, the global page scanner picks up an entry in the page-sharing table for a host (chosen at random or sequentially), and then sends the page signature and corresponding page contents to all hosts in the cluster. The global page scanner then waits for a reply from each host. If a recipient host does not have an entry in its page-sharing table with the same page signature, it sends a "don't care" message to the global page scanner. If a recipient host has an entry in its page-sharing table with the same page signature and the corresponding page contents match, there are two cases. If the entry for the page signature already has the "standard" and "verified" flags set, the host sends a "standard" message to the global page scanner. Otherwise, it sends a "positive" message to the global page scanner.

If a recipient host has an entry in its page-sharing table with the page signature, but the page contents do not match that sent by the global page scanner, there are two cases. If the "standard" and "verified" flags for the entry are set, the recipient host sends a "collision" message to the global page scanner. Otherwise, it sends a "negative" message to the global page scanner.

If the global page scanner receives only "standard", "positive", "negative" and "don't care" messages from each host, it then informs all hosts that sent "positive" messages to set the "standard" and "verified" flags for the entry in the local page-sharing table corresponding to the page signature. If the global page scanner receives a "collision" message from a host, it can optionally tell the hosts that sent "positive" messages to clear the "standard" flag, and set the "verified" flag, for the corresponding entry.

The global page scanner then picks the next entry and repeats the process. For efficiency, the global page scanner may pick a number of pages to process at the same time, or process different batches of pages in a pipelined approach. Note that neither the global page scanner nor any recipient host need not save the page signature or corresponding page contents as received from the global page scanner to perform this process. Rather, each can simply allocate a temporary buffer for storage of these elements during the process of reaping.

In another implementation, each host in the cluster has its own global page scanner. The global page scanner in a host picks up an entry whose "verified" flag is clear. It then sends a request to match the page signature and corresponding page contents from the entry to all other hosts in the cluster, one by one. If a recipient host replies with a "standard" message, then the global page scanner can locally set the "standard" and "verified" flags for the entry and stop. If the host replies with a "collision" or "negative" message, the global page scanner can locally clear the "standard" flag and set the "verified" flag (signaling a "collision") and stop. If the host replies with either a "positive" or "don't care" message, the global page scanner continues with the next host. If there is no host replying "collision" or "negative" after all hosts in the cluster have responded, the global page scanner locally sets the "standard" and "verified" flags for the entry. It can then tell those hosts that responded with a "positive" message to set the "standard" and "verified" flags for their entry.

The process is then repeated for the next entry. The global page scanner may pick a batch of entries to process at a time. Again, the global page scanner may also perform the foregoing reaping process periodically or only when the host processor and interconnecting network are idle.

Turning back to FIG. 3, once the migration of $VM_n$ from the source host 202 to the destination host 240 has been accomplished, the database 300 may be retained for use by the destination host 240 for the purpose of garnering additional efficiencies. For example, when the decision has been made to swap out a stored page (such as page 252b) from the destination host memory 250, if the page contents of the page are already present the database 300, in lieu of swapping out the stored page to secondary storage, the destination host computer 241 can simply discard the page contents and use the page signature to refer to the page. If it becomes necessary to swap the contents of this page back into the destination host memory 250, the destination host computer 241 can simply obtain these contents from database 300. In other words, retention of these contents in database 300 avoids the need to swap these contents to secondary storage.

The invention may also be applied to other applications besides virtual machine migration from a source host to a destination host. For example, it should be appreciated that the invention may also be applied to the process of restoring a virtual machine from a checkpoint (also known as a snapshot) of its state, or resuming execution of a suspended virtual machine. In such applications, a virtual machine is retrieved or received from a source, which may be local or remote, and which may include disk storage on which the virtual machine is stored, and then recreated on the host. In this application, in lieu of a source host and a destination host, there is a source and a host, with the virtual machine being transmitted by the source to the host, and then recreated on the host. Put differently, the case where the VM is suspended (a snapshot of its state is obtained, and then the VM is powered off) or resumed to or from a disk, the system hosting the VM may comprise both the source and the destination (the local source case), with the system memory (at least, the portion holding the file(s) defining the VM) being the source and the system disk being the destination; in the case of resuming a suspended VM, the source/destination would be reversed, with the disk being the source and the memory being the destination; alternatively, the checkpointed state could be retrieved from a remote location, in which case the remote system in which the checkpointed state information is resident is the source and the local system into which this information is retrieved is the destination.

In summary, it can be seen from the foregoing that at least three embodiments of the system 200 have been described, each characterized by a different mechanism for disambiguating pages in relation to the destination host. In the first, the source host 202 disambiguates a signature by transmitting it to the destination host 240 accompanied by its corresponding page contents. In the second embodiment, the source host 202 disambiguates a signature by sending it, when appropriate, with an indication (such as a flag setting) that its corresponding page contents have already been transmitted to the destination host 240 and uniquely associated there with the corresponding page contents. In the third embodiment, the source host 202 disambiguates a signature by sending it, when appropriate, with an indication that its corresponding page contents are the "standard" page contents for the signature, accessible by the destination host 240 from a database 300.

Embodiments in addition to these are possible, for example, an embodiment where a signature is augmented with an identifier naming or specifying a particular database from amongst a plurality of similar databases, each uniquely associating page signatures with "standard" page contents, for example one database uniquely associating page signatures with "standard" Windows page contents, another for uniquely associating page signatures with "standard" Linux page contents, etc.

In many of the embodiments of the invention described above, the contents of pages are compared when their signatures match. The contents of at least one of the pages to be compared are then usually assumed to be resident in the host doing the comparison. It would also be possible according to the invention for one or more pages to be stored remotely, and not just as in the "standard page database" embodiment shown in FIG. 3. For example, the signature could be augmented with some form of network address, such as an IP address or URL that is a query to a remotely located database, which, when queried, returns the contents of a corresponding page.

This would be particularly advantageous for implementing the standard database 300, since entries could then be updated easily at one or more central servers. Providers of commodity software (such as common operating systems or application) that might be loaded in VMs could then maintain a central directory of contents indexed according to hash values. The hash function could then either be some agreed-upon standard, or could be specified as yet another parameter of the signature.

The signature used in the invention need not be limited to a single-value result of a hash function, but could be augmented with even other parameters. For example, the signature could include a key, password or other unique identifier, so that only authorized (such as licensed) users could access a remote content database, or only trusted or safe VMs could, during migration, use the invention In each of these embodiments, a signature is disambiguated by augmenting it at the source host 202 with additional information, i.e., the page contents, one or more flags, or a database identifier, etc., sufficient to avoid ambiguity at the destination host 240. However, it should be appreciated that embodiments are possible where this disambiguating, if not already performed by the source host 202, is performed en route to the destination host 240.

A benefit that may be realized in each of these embodiments is that pressure on the destination host memory 250 due to virtual machine migration may be alleviated by page-sharing that is made possible at the destination host 240 due to the disambiguation of the page signatures that occurs. Another benefit that can be realized in the second and third embodiments, compared to the first, is that the amount of data that needs to be transmitted to achieve the migration can be reduced, thus increasing the speed and reducing the latency of the migration. A further benefit is the reduction in size of the page signatures that may result through a disambiguating means, which eliminates ambiguity and the risk of collisions at the destination host, without the need to increase the size of the page signatures.

Flowcharts of methods of operation by the source host and the destination host, illustrated in FIGS. 4-5, respectively, will now be described in turn.

Figure 4:
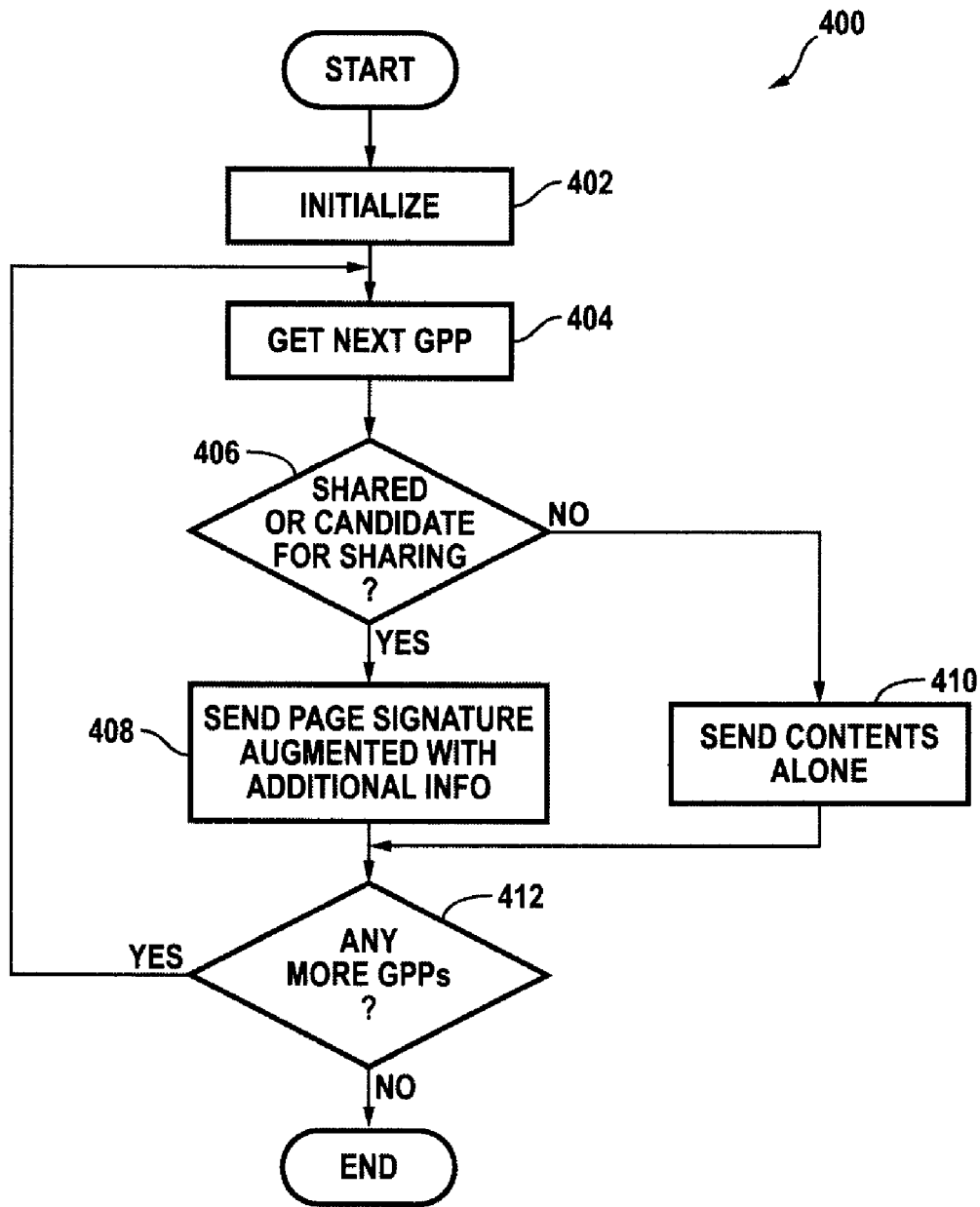
FIG. 4 is a flowchart of an embodiment of a method, to be performed by a source host in a system for migrating a virtual machine, at least in part, from the source host to the destination host.

FIG. 4 is a flowchart of a method 400 to be performed by a source host computer in the source host. This method may be tangibly embodied as computer software, that is, executable code and data, stored on a computer-readable storage medium. Although the flowchart implies successive passes through the method steps, it should be appreciated that these passes may also be performed in parallel. The method 400 begins with the step shown in box 402, an initialization step, where a pointer used to step through the pages of the resident portion of guest physical pages of the virtual machine to be migrated is reset. Box 402 is followed by box 404. In box 404, the step of getting the next guest physical page (GPP) of the virtual machine to be migrated, for example, by updating the pointer, is performed. Box 404 is followed by diamond 406, where the step of querying whether the page accessed in box 404 is a shared page or a candidate for sharing is performed. If the page is a shared page or a candidate for sharing, for example, because it has a corresponding entry in the page-sharing hash table 222 in FIG. 2A, the method jumps to the step shown in box 408. Otherwise, the method jumps to the step shown in box 410.

In the step shown in box 408, the page signature for the page is either derived on the fly, for example, by applying a predetermined hash function to the page contents, or is obtained from the corresponding entry in the page-sharing data structure, such as page-sharing hash table 222. This signature is then disambiguated, for use by the destination host, by augmenting it with additional information that depends on the embodiment. In the first embodiment, this additional information is the page contents. In the second embodiment, this additional information, when the appropriate circumstances are present, is a flag indicating that the signature is one whose associated content has already been transmitted to the destination host and uniquely associated there with the signature. An example of such a page is an intra-VM shared page, the contents of which have previously been transmitted to the destination host accompanied by the page signature. In the third embodiment discussed, this additional information, again, when the appropriate circumstances are present, is a flag indicating that the corresponding page contents are "standard" page contents. In a fourth embodiment, this additional information, when appropriate, is a name or identifier of a database, accessible to the destination host, selected from a plurality of such databases, uniquely associating page signatures with "standard" page contents. In box 408, the signature, augmented with this additional information, is then transmitted to the destination host.

In box 410, reached when the page is neither shared nor a candidate for sharing, for example, because it does not have a corresponding entry in the page-sharing hash table 222, the page contents alone are transmitted to the destination host.

Boxes 408 and 410 are both followed by diamond 412. In the decision step illustrated by diamond 412, the method 412 queries whether there are any more guest physical pages of the virtual machine to be migrated. If so, the method jumps back to the step in box 404. If not, the method ends.

Figure 5:
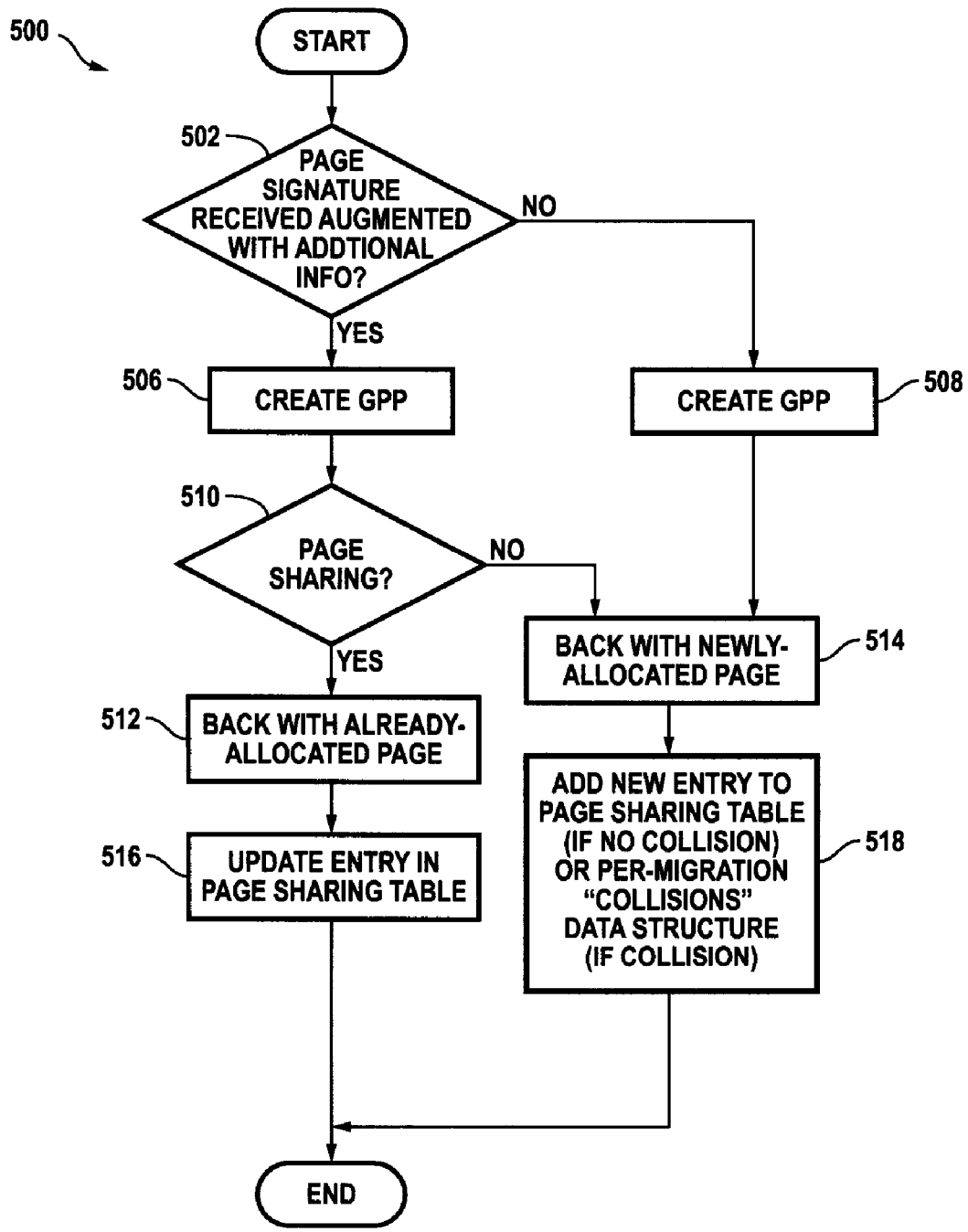
FIG. 5 is a flowchart of an embodiment of a method, to be performed by a migration process executing on a destination host in a system for migrating a virtual machine, at least in part, from a source host to the destination host.

FIG. 5 is a flowchart of a method 500 to be performed by a migration process executing on a destination host computer in the destination host. This method may be tangibly embodied as computer software stored on a computer-readable storage medium.

The method 500 is triggered when certain information, such as an augmented page signature, or page contents, is received from a source host as part of the process of migrating the guest physical address space of a virtual machine from the source host to the destination host.

The method 500 commences with the step illustrated by diamond 502, which queries whether or not the information received from the source host is a page signature augmented with additional information, for example, page contents, which is helpful for disambiguating the signature for use by the destination host. If so, the method 500, because the page is a shared page or a candidate for sharing at the source host, and so is a likely candidate for page-sharing at the destination host, jumps to the step shown in box 506. If not, the information received is necessarily page contents alone, unaccompanied by the page signature. Accordingly, method 500, because the page is neither shared nor a candidate for sharing at the source host, jumps to the step shown in box 508.

In the step shown in box 506, the method 500 creates a guest physical page on the destination host for the page in question, and then jumps to the step shown in diamond 510, which queries whether the page may be shared at the destination host.

In the case of the first embodiment, where the additional information accompanying the page signature is the page contents, the entries in the page-sharing hash table 254 are first checked to see if there is a matching entry. If there is, the page contents corresponding to the matching entry are then compared with the page contents as transmitted from the source host. If the contents match, then the method 500 jumps to the step shown in box 512. In the step shown in box 512, the guest physical page created in the step shown in box 506 is backed by the already-allocated page in the destination host memory corresponding to the matching entry in the page-sharing hash table 254. If there is no matching entry in the page-sharing hash table 254, or there is, but the page contents do not match, the method, concluding that the guest physical page created in box 506 cannot be shared, jumps to the step shown in box 514. In the step shown in box 514, the method 500 backs the page created in box 506 with a newly allocated page in the destination host memory, and sets the contents of this page to the page contents that were transmitted along with the page signature from the source host.

In the case of the second embodiment, where the additional information is a flag accompanying the page signature indicating it is one whose associated content has already been transmitted to the destination host and uniquely associated there with the signature, the method 500 checks for a matching entry, first in the per migration "collisions" data structure, and then in the page-sharing hash table 254. A match should be found in one or the other of these two data structures. If the match is found in the per migration "collisions" data structure, the method 500 concludes the page cannot be shared and so it jumps to the step shown in box 514. In the step shown in box 514, it backs the page with a newly allocated page in the destination host memory, and sets the content of this page to the page contents as obtained from the per migration "collisions" data structure. If the match is found in the page-sharing hash table 254, the method 500 assumes that this entry was the result of the previous transmission of the page signature and associated page contents. Accordingly, method 500, concluding that the guest physical page created in the step shown in box 506 can be shared, jumps to the step shown in box 512. In the step shown in box 512, the method 500 backs the guest physical page with the already allocated page in the destination host memory that corresponds to the matching entry in the hash table 254.

In the case of the third embodiment, where the additional information is a flag indicating that the corresponding page contents are "standard" page contents, the entries in the page-sharing hashing table 254 are checked to see if there is a matching entry whose "standard" flag is set. If so, the method 500 jumps to the step shown in box 512, where it backs the page with the already-allocated page corresponding to the matching entry. If there is a matching entry in the hash table 254, but the "standard" flag is clear, the method 500 obtains the corresponding page contents either from the source host, the database 300, or the per-migration "collisions" data structure at the destination host, and compares these with the page contents corresponding to the matching entry. If there is a match, the method 500 jumps to the step shown in box 512, where it backs the page with the already-allocated page corresponding to the matching entry. If there is no matching entry in the hash table 254, the method 500 obtains the corresponding page contents, either from the source host, the database 300, or the per migration "collisions" data structure at the destination host, and jumps to box the step shown in 514. In the step shown in box 514, the method 500 backs the guest physical page with a newly allocated page in the destination host memory, and sets the contents of this page to the page contents as obtained from one of the foregoing sources. (The fourth embodiment is handled similarly to the third embodiment).

In the step shown in box 508, the method 500 again creates a guest physical page on the destination host for the page in question, and then jumps to the step shown in box 514. In the step shown in box 514, the method 500 backs the page in the destination host memory with a newly allocated page. Alternatively, the method 500 derives the page signature on the fly from the page contents, and then checks the entries of the page-sharing hash table 254 for a matching entry with the signature. If such an entry is not found, or is found but the page contents do not match, the method 500 proceeds as before. If such an entry is found, and the page contents match, the method 500 jumps to the step shown in box 512, where it backs the page with the already-allocated page corresponding to the matching entry.

From the step shown in box 512, the method 500 proceeds to the step shown in box 516. In the step shown in box 516, the method 500 increments the reference count in the corresponding page-sharing hash table 254. Also, in the case of the third embodiment, it sets the "standard" flag, provided the flag was clear and a page comparison indicates that the allocated page contains the "standard" page contents. The method 500 then concludes.

From the step shown in box 514, the method 500 proceeds to the step shown in box 518. In the step shown in box 518, the method 500 adds a new entry to the page-sharing hash table 254 for the newly-allocated page in the destination host memory provided there is no collision with an existing entry in the hash table 254. If there is a collision, an entry is instead made to the per-migration "collisions" data structure. Then method 500 then concludes.

It should be appreciated that embodiments in addition to those described and illustrated above are possible. For example, in the described and illustrated embodiments, the guest physical address spaces of the virtual machines, as well as the host memories and secondary storage, have been assumed to be apportioned into pages. However, as mentioned above, it should be appreciated that the invention is not so limited and encompasses embodiments where the guest physical address spaces, host memories, and secondary storage, are apportioned into any non-uniformly sized contiguous regions, which are often referred to as segments, as well as non-contiguous regions.

Additionally, it should be appreciated that embodiments are possible where the set state of a flag is the state where the flag is a logical "1," and the clear state of the flag is the state where the flag is a logical "0." It should also be appreciated that embodiments are also possible where the set state of a flag is the state where the flag is a logical "0," and the clear state of the flag is the state where the flag is a logical "1."

Based on the foregoing, it should be appreciated that the foregoing descriptions of specific embodiments of the present invention are presented for purposes of illustration and description. They are not intended to be exhaustive or to limit the invention to the precise forms disclosed. Obviously, many modifications and variations are possible in view of the above teachings. While the embodiments were chosen and described in order to best explain the principles of the invention and its practical applications, thereby enabling others skilled in the art to best utilize the invention, various embodiments with various modifications as are suited to the particular use are also possible. The scope of the invention is to be defined only by the claims appended hereto, and by their equivalents.

What is claimed is:

1. A method comprising:

determining, at a destination host, a source signature associated with additional information during a migration of a virtual machine from a source host to the destination host, the source signature having a unique association in a source data structure with source content stored in a portion of memory at the source host;

storing the source content in a portion of address space of the virtual machine in the destination host;

determining if the source signature matches a host signature in a host data structure, the host signature having a unique association with host content stored in a portion of memory in the destination host memory;

if the source signature matches the host signature, performing:

using the additional information to determine if the unique association between the source content and the source signature in the source data structure matches the unique association between the host content and the host signature in the host data structure; and storing backing information indicating the portion of the address space of the virtual machine storing the source content is backed with the portion of the destination host memory storing the host content.

2. The method of claim 1, wherein the additional information comprises an indication the source content has been sent to the destination host and has been stored as the host content having the matching unique association, wherein if the source signature matches the host signature, the backing information is stored without comparing the source content and the host content.

3. The method of claim 1, wherein the additional information comprises a first flag indicating the source signature has the unique association with the source content in a content data structure, wherein if a second flag associated with the host signature is set indicating the host signature has the same unique association in the content data structure, the backing information is stored without comparing the source content and the host content.

4. The method of claim 1, wherein the unique association between the source content and the source signature in the source data structure and the unique association between the host content and the host signature in the host data structure is generated by only allowing one entry in the source data structure for the source signature or one entry in the host data structure for the host signature.

5. The method of claim 1, further comprising:
adding the source signature to a collision data structure separate from the host data structure if the source content does not match the host content, the collision data structure storing source signatures that match host signatures in the host data structure where the source content collides with the host content.

6. A system for migrating, at least in part, a virtual machine from a source host to a destination host, the virtual machine having an address space, each of one or more portions of the address space of the virtual machine having content uniquely associated at the source host with a source signature that, absent disambiguation, may collide with different content at the destination host, wherein the source host is configured to make available one or more of said source signatures to the destination host, wherein the destination host has a destination host memory, the system comprising:
computer-executable disambiguation code for disambiguating a source signature by augmenting the one or more signatures at the source host with additional information, the source signature associated with source content stored in a portion of source host memory, the portion of source host memory backing a portion of the address space storing the source content for the virtual machine in the source host;
logic for storing the source content in a portion of address space of the virtual machine in the destination host; and
logic for determining whether the source content associated with a the source signature is already present in the destination host memory, wherein the logic for determining comprises:
logic for determining if the source signature matches a host signature, the host signature having a unique association with host content stored in a portion of the destination host memory;
logic, if the source signature matches the host signature, for:
using the additional information to determine if the host content matches the source content; and
storing backing information indicating the portion of the address space of the virtual machine having the source content in the destination host is backed with the portion of the destination host memory already holding the host content if the host content matches the source content.

7. The system of claim 6 wherein the one or more portions of the address space of the virtual machine are each pages.

8. The system of claim 6 where each signature is a hash identifier derived by applying a predetermined hash function to the associated content.

9. The system of claim 6 wherein the additional information comprises the source content, wherein the disambiguation code is further provided for transmitting a the source signature from the source host to the destination host along with the source content, wherein the source content is used to determine if the source content matches the host content.

10. The system of claim 6 wherein the disambiguation code is further provided for transmitting the source signature and the additional information from the source host to the destination host, wherein the additional information comprises an indication that the source signature is one whose source content has already been transmitted to the destination host and uniquely associated at the destination host with the host signature.

11. The system of claim 6 wherein the disambiguation code is further provided for setting a flag for the source signature as the additional information, at either the source host or destination host, to indicate the source signature is uniquely associated with the source content stored in a data structure accessible to at least the destination host.

12. The system of claim 6 wherein the source and host signatures are produced as a byproduct of a page-sharing program executing on either the source or destination host.

13. The system of claim 6 wherein the source host includes disk storage, and the source signature is made available from the disk storage to the destination host as part of the process of restoring the virtual machine from a checkpoint.

14. The system of claim 6 wherein the disambiguation code comprises an independent process executing on either or both the destination host and the source host.

15. The system of claim 6, wherein a source data structure includes a unique association between the source content and the source signature and a host data structure includes a unique association between the host content and the host signature,
wherein logic for using the additional information comprises logic for using the additional information to determine if the unique association between the source content and the source signature matches a unique association between the host content and the host signature if the source signature matches the host signature.

16. The system of claim 15, wherein using the additional information comprises:
logic for identifying the source content using the additional information;
logic for comparing the source content with the host content to determine if the source content matches the host content; and
logic for determining the unique association between the source content and the signature in the source table is the same unique association between the host content and the host signature in the host table if the source content matches the host content.

17. The system of claim 15, further comprising:
logic for adding the source signature to a collision data structure separate from the host data structure if the source content does not match the host content, the collision data structure storing source signatures that match host signatures in the host data structure where source content collides with host content.

18. In a system for migrating, at least in part, a virtual machine from a source host to a destination host, the virtual machine having an address space, each of one or more portions of the address space of the virtual machine having a content uniquely associated at the source host with a source signature that, absent disambiguation, may collide with different content at the destination host, wherein the destination host has a destination host computer and a destination host memory, the source host is configured to pass one or more of said source signatures to the destination host, and the system includes computer-executable code for disambiguating said one or more source signatures so that each of said disambiguated signatures may be uniquely associated with content at the destination host, and so that collisions with different content are avoided at the destination host,
a computer readable storage medium holding computer software for executing on the destination host computer, the software embodying a method comprising:

receiving or retrieving a source signature from the source, the source signature associated with source content stored in a portion of source host memory, the portion of source host memory backing a portion of the address space storing the source content for the virtual machine in the source host the source signature being disambiguated by augmenting the source signature at the source host with additional information;

storing the source content in a portion of address space of the virtual machine in the destination host; and determining whether the source content associated with the source signature at the destination is already present in the destination memory, wherein determining comprises:

determining if the source signature matches a host signature, the host signature having a unique association with host content stored in a portion of the destination host memory;

if the source signature matches the host signature, performing:

using the additional information to determine if the host content matches the source content; and storing backing information indicating the portion of the address space of the virtual machine having the source content in the destination host is backed with the portion of the destination host memory already holding the host content if the host content matches the source content.

19. The computer readable storage medium of claim 18 wherein the source includes disk storage, and the method further comprises retrieving the one or more signatures from the disk storage as part of a checkpoint recovery process.

20. The computer readable storage medium of claim 18 wherein the method further comprises receiving the source signature from the source host as part of a virtual machine migration process.

21. The computer readable storage medium of claim 18 wherein the additional information comprises the source content, wherein the signature is passed by the source to the destination along with the source content.

22. The computer readable storage medium of claim 18 wherein the destination host disambiguates the source signature by using the additional information to identify the source signature as one whose source content has already been received and uniquely associated with the host signature.

23. The computer-readable storage medium of claim 18 wherein the source host disambiguates the source signature by setting a flag as the additional information to flag it the source signature as one that is uniquely associated with source content stored in a data structure accessible at least to the destination host.

24. A method for migrating, at least in part, a virtual machine from a source host to a destination host, the virtual machine having an address space, each of one or more portions of the address space of the virtual machine having content uniquely associated at the source host with a source signature that, absent disambiguation, may collide with different content at the destination host, wherein the source host is configured to make available one or more of said source signatures to the destination host, wherein the destination host has a destination host memory, the method comprising:

disambiguating a source signature by augmenting the one or more signatures at the source host with additional information, the source signature associated with source content stored in a portion of source host memory, the portion of source host memory backing a portion of the address space storing the source content for the virtual machine in the source host;

storing the source content in a portion of address space of the virtual machine in the destination host; and determining whether the source content associated with the source signature is already present in a destination host memory, wherein the logic for determining comprises:

determining if the source signature matches a host signature, the host signature having a unique association with host content stored in a portion of the destination host memory;

if the source signature matches the host signature, performing:

using the additional information to determine if the host content matches the source content; and storing backing information indicating the portion of the address space of the virtual machine having the source content in the destination host is backed with the portion of the destination host memory already holding the host content if the host content matches the source content.

25. The method of claim 24 wherein the portion of the address space of the virtual machine is a page.

26. The method of claim 24, further comprising deriving the source signature as a hash identifier by applying a predetermined hash function to the source content.

27. The method of claim 24, wherein the additional information comprises the source content, the method further comprising sending the source signature from the source host to the destination host along with the source content, wherein the source content is used to determine if the source content matches the host content.

28. The method of claim 24, further comprising sending the source signature and the additional information from the source host to the destination host, wherein the additional information comprises an indication that the source signature is one whose source content has already been sent to the destination host and uniquely associated at the destination host with the host signature.

29. The method of claim 24, further comprising setting a flag for the source signature as the additional information, at either the source host or destination host, to indicate it the source signature is uniquely associated with the source content stored in a data structure accessible to at least the destination host.

30. The method of claim 24, further comprising producing the source signature as a byproduct of a page-sharing program executing on either the source or destination host.

31. The method of claim 24, further comprising deriving the source signature as a hash identifier by applying a predetermined hash function to the source content.

32. The method of claim 24, in which the source host and destination host are components of a single host system.

33. The method of claim 32, in which the source host is host memory in which at least part of the virtual machine is resident and the destination host is a host disk.

34. The method of claim 32, in which the destination host is host memory in which at least part of the virtual machine is to be resident and the source host is a host disk.

35. The method of claim 32, in which the method of migrating the virtual machine is carried out in conjunction with the suspension of the virtual machine at a checkpointed state or the resumption of the suspended virtual machine to a previously checkpointed state.

36. The method of claim 24, in which the source host is a remote host in which checkpointed state information of a suspended virtual machine (VMS is resident and the destination is a local host into which the checkpointed state information is sent so as to resume operation of the suspended VM at the local host.

* * * * *